United States Patent
Yoshimura et al.

(10) Patent No.: US 6,546,435 B1
(45) Date of Patent: Apr. 8, 2003

(54) PORTABLE PROGRAMMING DEVICE FOR SUPERVISORY REMOTE CONTROL SYSTEM

(75) Inventors: Yuichi Yoshimura, Tsu (JP); Toshiaki Tokizane, Tsu (JP); Shinji Sakasegawa, Tsu (JP)

(73) Assignee: Matsushita Electric Works, Ltd., Osaka (JP)

(*) Notice: Subject to any disclaimer, the term of this patent is extended or adjusted under 35 U.S.C. 154(b) by 470 days.

(21) Appl. No.: 09/591,483

(22) Filed: Jun. 12, 2000

(30) Foreign Application Priority Data

Jun. 15, 1999 (JP) .......................... 11-168988
Jun. 15, 1999 (JP) .......................... 11-168989
Jun. 15, 1999 (JP) .......................... 11-168990

(51) Int. Cl.[7] ................................ G06F 3/00
(52) U.S. Cl. ................. 710/4; 710/9; 710/14; 710/18; 370/294; 370/347
(58) Field of Search ............... 710/4, 9; 370/294, 370/347; 340/870.41

(56) References Cited

U.S. PATENT DOCUMENTS

| | | | | |
|---|---|---|---|---|
| 4,780,872 A | * | 10/1988 | Masuda et al. ............. | 370/475 |
| 5,117,421 A | | 5/1992 | Tokizane et al. | |
| 5,870,155 A | * | 2/1999 | Erlin .......................... | 348/734 |
| 6,201,554 B1 | * | 3/2001 | Lands ........................ | 345/169 |
| 6,269,342 B1 | * | 7/2001 | Brick et al. ................ | 705/20 |

* cited by examiner

Primary Examiner—Jeffrey Gaffin
Assistant Examiner—Eron Sorrell
(74) Attorney, Agent, or Firm—Rader, Fishman & Grauer PLLC

(57) ABSTRACT

A portable programming device is used in a supervisory remote control system comprising a signal transmission unit for supplying a signal according to a TDM (Time Division Multiplexing) manner, first and second terminals having individual addresses, and a signal line connecting therebetween. According to a set of relation data including an address correspondence between one of the second terminals and one of the first terminals and control data including control parameters of a load, the load connected to the one of the second terminals can be controlled according to a supervisory input provided to the one of the first terminals. The programming device has a hand-held type housing for accommodating a display, operation unit for programming an address, the relation data and the control data, data memory, and a signal processor for transferring the address to a required one of the first and second terminals, and transferring the relation data and the control data stored in the data memory to the transmission unit. The signal processor further comprises a data retrieving unit for retrieving at least one set of the relation data and the control data corresponding to an address designated by the operation unit from the transmission unit, and listing a name given to the set on the display.

18 Claims, 18 Drawing Sheets

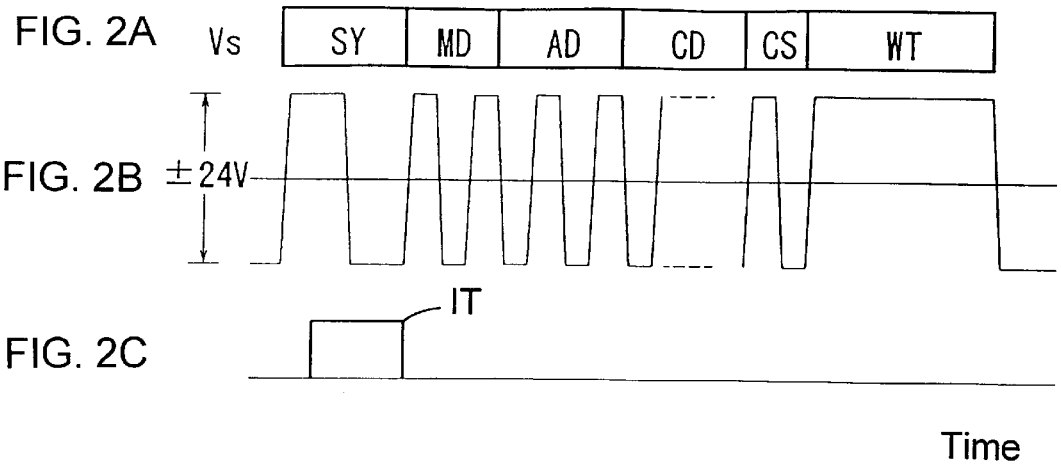
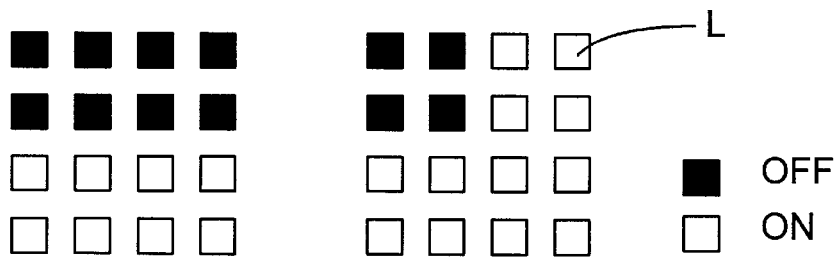
FIG. 3A    FIG. 3B
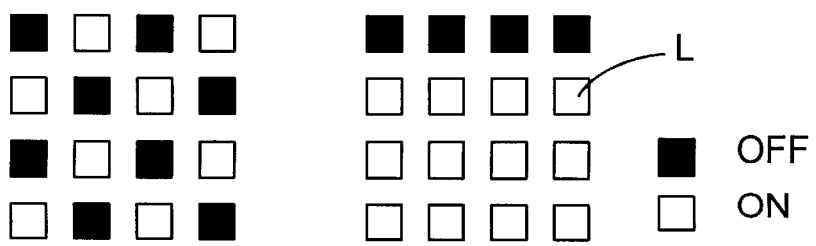
FIG. 4A    FIG. 4B

| Separate | | — | — | — |
|---|---|---|---|---|
| G | | — | — | — |
| | — | — | — | — |
| | — | — | — | — |

FIG. 15

| Separate | 0 – 1 | — | Delay min. 5 | — |
|---|---|---|---|---|
| G | | — | — | — |
| | — | — | — | — |
| | — | — | — | — |

FIG. 16

| P  1 | 0 – 1 | ON | Delay sec. 30 | 7 |
|---|---|---|---|---|
| FADE None | 0 – 2 | ON | | 7 |
| ALL ON | 0 – 3 | ON | | 7 |
| | 0 – 4 | ON | | 7 |

FIG. 17

| P | 1 | 0-1 | ON | | 7 |
|---|---|-----|-----|---|---|
| FADE None | | 0-2 | ON | | 7 |
| ALL ON | | 0-3 | ON | | 7 |
| | | 0-4 | ON | | 7 |

FIG. 18

| P | 1 | 0-1 | ON | | 7 |
|---|---|-----|-----|---|---|
| FADE 3sec. | | 0-2 | ON | | 7 |
| ALL ON | | 0-3 | ON | | 7 |
| | | 0-4 | ON | | 7 |

FIG. 19

| P | 1 | 0-1 | ON | | 7 |
|---|---|-----|-----|---|---|
| FADE None | | 0-2 | ON | | 7 |
| ALL ON | | 0-3 | ON | | 7 |
| | | 0-4 | ON | | 7 |

FIG. 20

| Operation Beep | YES |
|---|---|
| Power OFF Time | 5 min. |
| Transmission Unit | WRT2040 |
| Checking the number of terminals | NO |

FIG. 21

The number of terminals is changed.

Terminal Number 2-1

Return ▷ | Cancel

FIG. 22

| Transmission Unit | INPUT |
|---|---|
| CHECK | Operation Checked. |
| EDIT | All Delete |
| Setting Condition | P/G Setting Mode |

FIG. 23

| Name of Unassigned Terminal | | 1 | / 1 |
|---|---|---|---|
| 0-1 | 0-2 | 0-3 | 0-4 |
| 23-1 | 25-2 | 34-1 | 34-4 |
| 1 | 3 | 14 | 16 |

| Address | Separate | 11-2 | 1 | / 1 |
|---|---|---|---|---|
| P1 | P12 | P15 | G1 | |
| G7 | | | | |
| | | | | |

FIG. 27

| Separate | 1 | 2 | 3 | 4 |
|---|---|---|---|---|
| 0 ch. | — | ON | ON | OFF |
| 1 ch. | — | OFF | ON | ON |
| 2 ch. | — | OFF | ON | ON |

FIG. 28

| P1 | 1 | 2 | 3 | 4 |
|---|---|---|---|---|
| 0 ch. | — | ON | ON | OFF |
| 1 ch. | — | OFF | ON | ON |
| 2 ch. | — | OFF | ON | ON |

FIG. 29

PORTABLE PROGRAMMING DEVICE FOR SUPERVISORY REMOTE CONTROL SYSTEM

BACKGROUND OF THE INVENTION

1. Field of the Invention

The present invention relates to a portable programming device for programming correspondences between supervisory inputs and loads and control conditions of the individual loads, which is used for a supervisory remote control system capable of transmitting transmission signals to signal lines according to a TDM (Time Division Multiplexing) manner and controlling the loads by use of the transmission signals according to the supervisory inputs.

2. Disclosure of the Prior Art

In the past, a supervisory remote control system for controlling various equipments from a distance is used in electric-power companies, power plants, and so on. In recent years, the system has a wide applicability of controlling lightings or air conditioners in structures such as office buildings.

For example, as shown in FIG. 31, the supervisory remote control system for controlling lightings L comprises a signal transmission unit 30, a plurality of operation terminals 31 for operating the lightings L, a plurality of control terminals 32 having relays therein, which are used to control the lightings L as loads, and a signal line Ls for connecting the transmission unit 30 to each of the operation and control terminals. In FIG. 31, separate switches 31a and pattern switches 31b are shown as the operation terminals 31. The operation terminals 31 and the control terminals 32 have individual addresses. For example, when a separate switch 31a is operated, a signal is sent to the transmission unit 30 through the signal line Ls. The signal is read by the transmission unit, and then the signal is provided through the signal line Ls to a relay of one of the control terminals 32 in a one-to-one address correspondence with the separate switch 31a. The relay carries out an ON/OFF operation of the corresponding lighting L of the load according to the received signal. According to this system, plural lightings L can be controlled in a batch manner by operation of a single switch.

In this system, a programming device 33 is usually used to set the address of each of the operation terminals 31 and the control terminals 32 and control parameters of the lightings L. This programming device 33 accommodates a large number of switch circuits S therein. For example, when the programming device has 64 switch circuits S, each of which can provide four different operations, 256 operations are available. By use of such a programming device, a set of relation data including a statement of an address correspondence between the operation terminal and at least one control terminals and control data including control parameters of the load(s) can be prepared. Therefore, there is an advantage that the programming operation is easy to perform, as compared with a case that the programming operation is performed by the individual switch.

However, since the programming device 33 having the large number of switch circuits is very expensive, heavy and large, it is ordinary fixed to a control panel and so on. That is, such a large programming device is not suitable for medium- and small-scaled supervisory remote control systems, in which the number of operation and control terminals is relatively small.

SUMMARY OF THE INVENTION

Therefore, a primary object of the present invention is to provide a portable programming device for a supervisory remote control system, which can present the convenience of portability as well as various convenient functions for efficiently and easily perform programming operations.

That is, the portable programming of the present invention is used in the supervisory remote control system comprising a signal transmission unit for supplying a transmission signal according to a time-division-multiplexing manner, a plurality of first terminals having individual addresses, a plurality of second terminals having individual addresses, and a signal line for connecting the transmission unit to each of the first and second terminals. In the remote control system, when a set of relation data including a statement of a one-to-one address correspondence between one of the second terminals and one of the first terminals and control data including control parameters of a load are set in the transmission unit, the load connected to the one of the second terminals is controlled according to an input provided to the one of the first terminals. When a set of relation data including a statement of an address correspondence between at least two of the second terminals and one of the first terminals and control data including control parameters of loads are set in the transmission unit, the loads connected to the at least two of the second terminals are controlled according to an input provided to the one of the first terminals in a batch manner.

The programming device of the present invention used in the above-described remote control system has a hand-held type housing for accommodating a display for displaying data to be set, operation unit for programming an address of each of the first and second terminals, the relation data, and the control data with help of the display, data memory for storing the address, the relation data and the control data set by use of the operation unit and the display, and a signal processor for carrying out a first signal process of transferring the address set by use of the operation unit and the display to a required one of the first and second terminals, and a second signal process of transferring the relation data and the control data stored in the data memory to the transmission unit. The signal processor further comprises a data retrieving unit for retrieving at least one set of the relation data and the control data corresponding to an address designated by the operation unit from the transmission unit, and listing a name given to the set of the relation data and the control data on the display. For example, when changing a layout of the loads, it is possible to immediately check at least one set of the relation data and the control data corresponding to the address of a desired load. Therefore, there is a convenience that the relation data and/or control data can be readily and efficiently corrected, if necessary.

It is preferred that the signal processor has a copy unit for copying a desired control parameter of the control data stored in the data memory to make another control data with use of the copied parameter. In this case, it is possible to efficiently prepare the control data.

It is preferred that the control data includes information about an ON/OFF operation of the load, and the signal processor has a switch unit for switching between OFF and ON positions of the load with respect to the control data stored in the data memory. For example, a first set of the relation data and the control data having the ON position as a setting of the load is prepared, and copied by use of the copy unit. Next, with respect to the copy of the first set, the ON position is reversed to the OFF position by use of the switch unit, so that a second set of the relation data and the control data, which is the same as the first set except for the OFF position as the setting of the load, can be readily prepared. Thus, the switch unit enhances the data preparation.

It is preferred that the signal processor has a first setting unit for setting the control parameters in a batch manner such that desired plural sets of the relation data and the control data are identical in all of the control parameters of the loads with each other, and a second setting unit for removing all of the loads concerning the desired plural sets of the relation data and the control data from a focus of control in a batch manner. For example, the plural sets of the relation data and the control data, which are identical in all of the control parameters with each other, are obtained by use of the first setting unit. Then, by changing only a desired control parameter of the plural sets, plural sets of the relation data and the control data, which are different from each other in the desired control parameter, can be readily prepared. Thus, the data preparing operation can be enhanced.

It is preferred that the programming device accommodates a battery in the housing, and the signal processor has a power-OFF unit for automatically stopping a supply of electricity from the battery when the operation unit is not operated for a predetermined time period under the supply of electricity. In this case, it is possible to prevent the battery exhaustion due to carelessness.

It is preferred that the programming device has a signal transceiver circuit for transmitting/receiving the transmission signal when the programming device is connected to the signal line, and the signal processor has a terminal check unit for checking the transmission signal through the signal transceiver circuit to detect a change of the number of the first and second terminals connected to the signal line according to address information included in the transmission signal. For example, when a terminal's failure or poor connection occurs, the number of first and second terminals connected to the signal line increases or decreases with the passage of time. Therefore, the terminal check unit is useful to detect the occurrence of an unusual event in the supervisory remote control system.

It is preferred that the signal processor has an unassigned-address check unit for receiving an operating condition of each of the first and second terminals from the transmission unit and providing a list of unassigned addresses that are available to additional terminals on the display. For example, when increasing the number of the first and/or second terminals, the unassigned addresses can be checked by the unassigned-address check unit. Therefore, it is possible to avoid providing an overlapped address to an additional terminal, and prevent the occurrence of an operation error due to the duplication.

It is preferred that the signal processor has an unassigned-name check unit for retrieving at least one set of the relation data and the control data from the transmission unit, and providing a list of unassigned names that can be given to the set of the relation data and the control data on the display. For example, when increasing the number of the first and/or second terminals, the unassigned names can be checked by the unassigned-name check unit. Therefore, it is possible to avoid providing an overlapped name to an additional terminal, and prevent the occurrence of an operation error due to the duplication.

It is preferred that the signal processor has an operation check unit for receiving operating conditions of each of the first and second terminals from the transmission unit and providing a list of the operating conditions together with corresponding address information on the display. In this case, it is possible to check as to whether each of the first and second terminals has desired operating conditions after data preparation be finished. Therefore, the settings of the relation data and the control data can be readily checked by use of the operation check unit.

It is preferred that the signal processor has a set-name indicating unit for providing a name given to a set of the relation data and the control data on the display during a time period for transmitting the set of the relation data and the control data to the transmission unit. In this case, since an operator of the programming device can always grasp the progress of data transmission by the display, it is possible to provide peace of mind as to the data transmission to the operator.

It is preferred that the programming device has a signal transceiver circuit for transmitting/receiving the transmission signal when the programming device is connected to the signal line, and the signal processor has a data transferring unit for transferring a set of the relation data and the control data to the transmission unit by use of the transmission signal during an idle time, in which the transmission signal is not used to control the load. In this case, when the transmission signal is not used to control the load, it is used to transmit the set of the relation data and the control data. Therefore, it is possible to safely perform the data transmission during the idle time without preventing the control of the load. In addition, since the transmission signal is used to transmit the set of the relation data and the control data, it is not-necessary to switch an operating condition of the supervisory remote control system from a control mode to a programming mode. Therefore, it is possible to perform maintenance such as reprogramming the relation data and control data without stopping the control of the load.

It is preferred that the signal processor has a selection unit for switching between a control mode, where the transmission unit controls the load, and a programming mode, where controlling the load is stopped and a set of the relation data and the control data are set by use of the operation unit.

It is preferred that the signal processor has a beeping unit for providing an operation beep every operation of the operation unit. In this case, since the operator of the programming device can recognize that each of data-programming operations is performed with reliability, it is possible to prevent the occurrence of programming error and provide peace of mind to the operator during the data preparation.

It is also preferred that the programming device has a signal transceiver circuit for transmitting/receiving the transmission signal when the programming device is connected to the signal line, and the signal processor has an operation check unit for checking as to whether the transmission unit normally operates by activating the programming device as a simulation terminal having a supervisory input provided by operation of the operation unit and an address provided on the display. For example, it is preferred that the address provided on the display has a one-to-one address correspondence with one of the second terminals for controlling the load. Alternatively, it is preferred that the address provided on the display has an address correspondence with plural second terminals to control the loads in a batch manner according to a predetermined pattern. In addition, it is preferred that the address provided on the display has an address correspondence with plural second terminals to control all of the loads in a predetermined area under a same condition in a batch manner. Concretely, when a lighting device is used as the load, it is preferred to use the address in an address correspondence with at least one of the second terminals for controlling the lighting device. In this case, the signal processor has a function of indicating a light-adjustment level of the lighting device.

Further features of the present invention and advantages brought thereby will be understood in detail from the following descriptions of the preferred embodiment of the present invention referring to the attached drawings.

BRIEF DESCRIPTION OF THE DRAWINGS

FIGS. 2A to 2C are explanatory diagrams of a transmission signal provided from a signal transmission unit;

FIGS. 3A and 3B are explanatory diagrams of operations of lighting devices according to a group-control manner;

FIGS. 4A and 4B are explanatory diagrams of operations of lighting devices according to a pattern-control manner;

Each of FIGS. 15 to 30 is a screen of the display unit under an operation of the programming device.

DETAIL DESCRIPTION OF THE PREFERRED EMBODIMENT

A preferred embodiment of the present invention is explained below in detail referring to the attached drawings.
[Supervisory Remote Control System]

Figure 1:
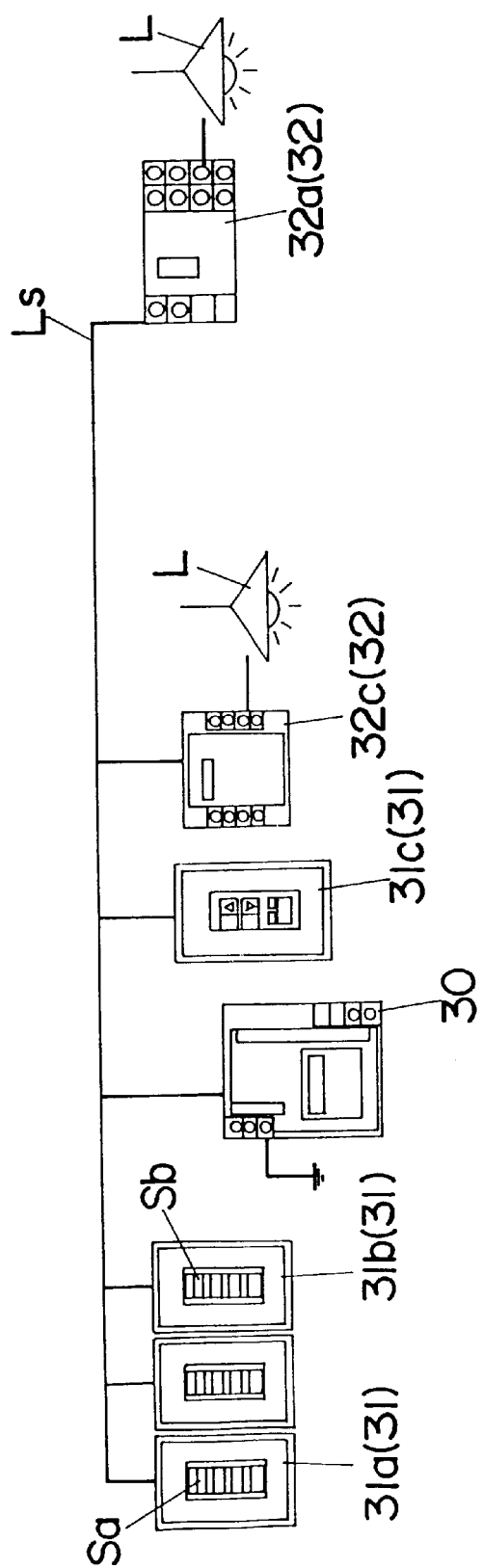
FIG. 1 is a schematic diagram of a supervisory remote control system.
Figure 5:
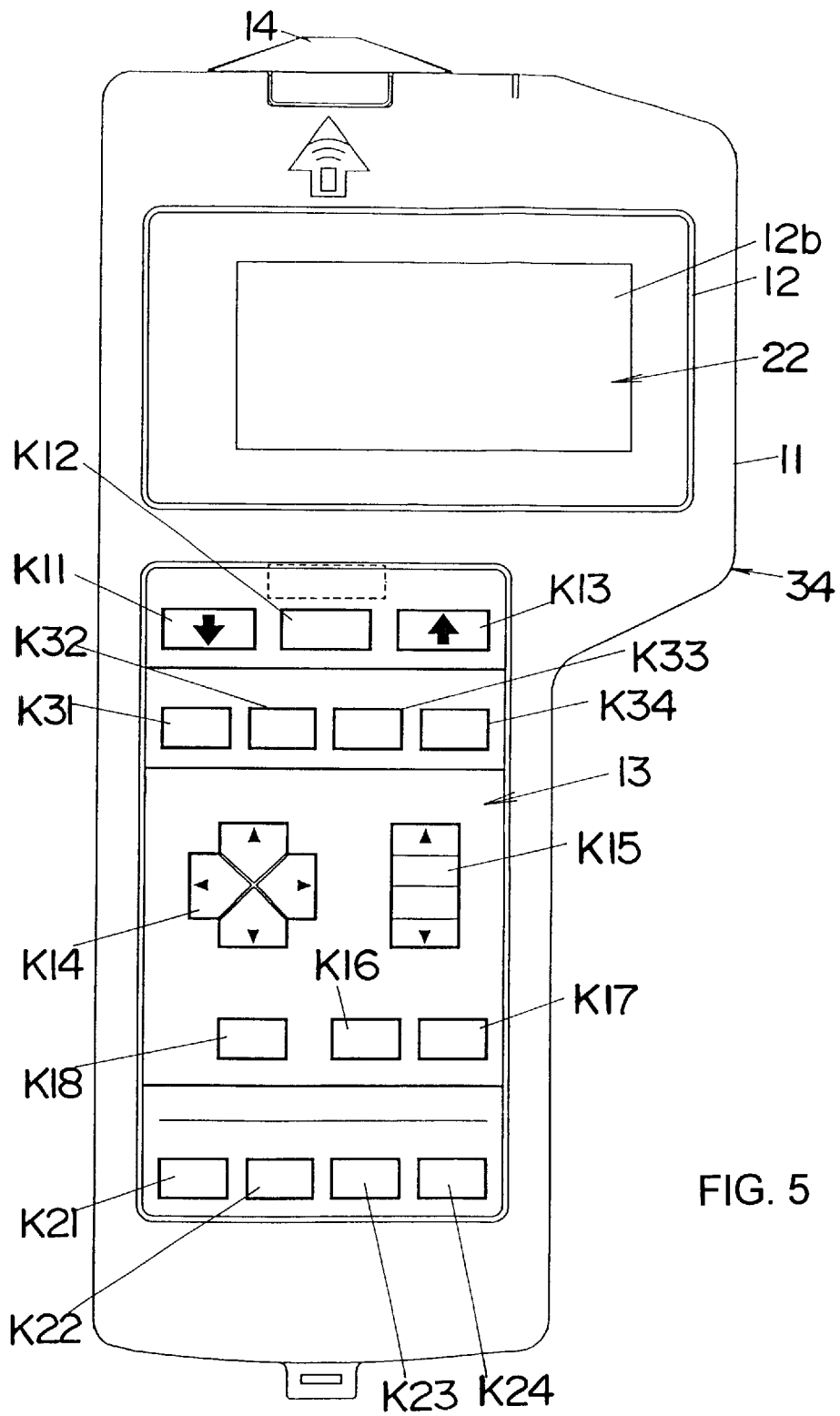
FIG. 5 is a front view of a portable programming device according to an embodiment of the present invention.
Figure 6:
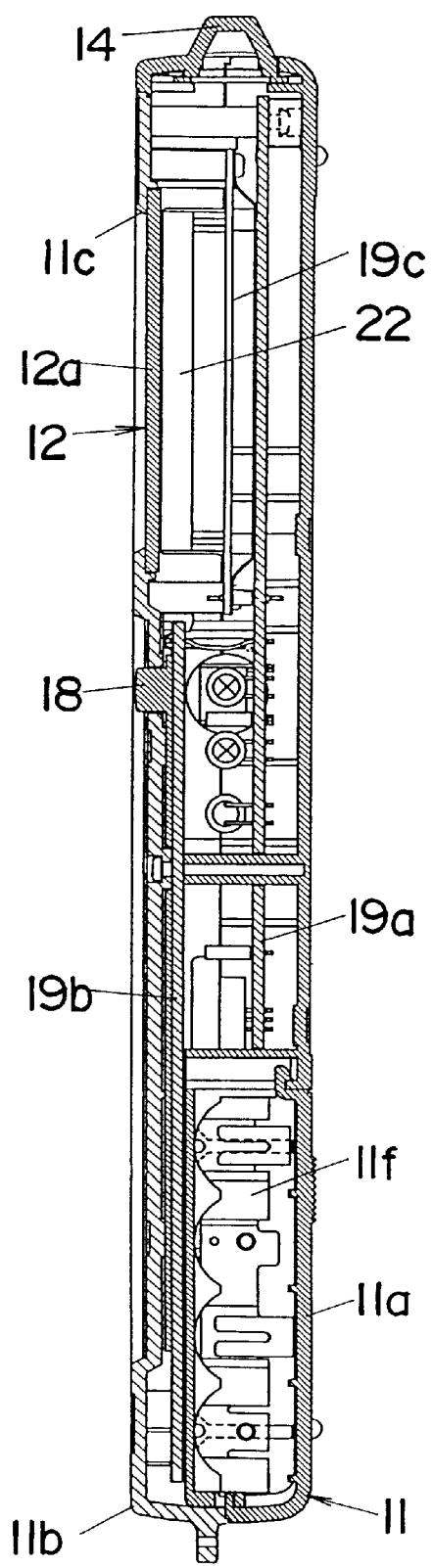
FIG. 6 is a cross-sectional, side view of the portable programming device.
Figure 7:
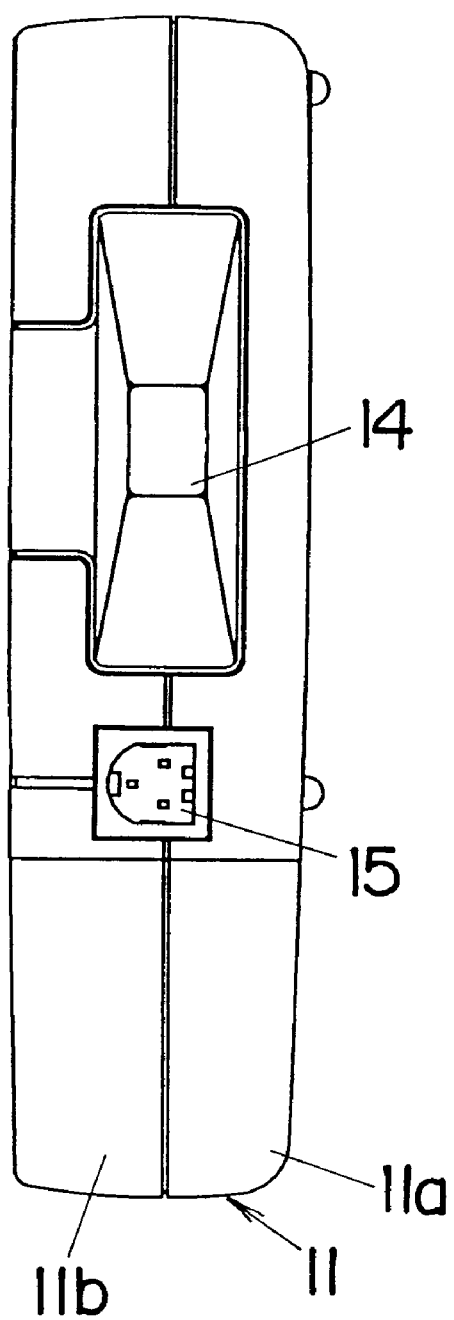
FIG. 7 is a top view of the portable programming device.

As shown in FIG. 1, a supervisory remote control system comprises a signal transmission unit 30 for supplying a transmission signal according to a TDM (Time Division Multiplexing) manner, a plurality of operation terminals 31 having individual addresses, a plurality of control terminals 32 having individual addresses, and a two-line type signal line Ls for connecting the transmission unit to each of the first and second terminals according to a multi-drop connection manner.

As the operation terminals 31, for example, three kinds of a separate switch 31a, pattern switch 31b, and a light-adjustment switch 31c are shown in FIG. 1. The transmission unit 30 can separately identify each of the operation and control terminals 31, 32 according to address information. The separate and pattern switches 31a, 31b have switches Sa, Sb for generating a supervisory input, respectively. As the control terminals 32, for example, a relay terminal 32a for controlling a relay placed between the lighting device L and a power source, and a light-adjustment terminal 32c for adjusting a light amount of the lighting device L by controlling a supply amount of electricity to the lighting device are shown in FIG. 1. A latching-type relay may be used as the relay. It is preferred that the operation terminal 31 has a check lamp (not shown) of a light-emitting diode for indicating an operating condition of the lighting device L. When the control terminal 32 activates the relay, electricity is pulsatively supplied to the relay.

The transmission unit 30 provides the transmission signal Vs having a format shown in FIG. 2A to the signal line Ls. That is, the transmission signal is a TDM (Time Division Multiplexing) signal of dual-polarity (±24 V), which includes a synchronization signal SY indicative of the start of sending out the signal, mode data MD indicative of a mode of the transmission signal Vs, address data AD for separately calling up the operation and control terminals 31, 32, control data CD for controlling the lighting device L, checksum data CS for detecting a transmission error, and a signal returning period WT that is a time slot for receiving a return signal (supervisory data) from the operation terminal 31 or the control terminal 32. In addition, as shown in FIG. 2B, the data transmission is performed according to a PWM (Pulse-Width Modulation) manner. In each of the operation and control terminals 31, 32, when the address data AD of the transmission signal Vs received through the signal line Ls is in agreement with a predetermined address, the control data CD is captured from the transmission signal Vs, and the supervisory data is returned as an electric-current mode signal during the signal returning period WT. The electric-current mode signal is a signal generated by making a short circuit in the signal line Ls through suitable low impedance.

When transmitting the data from the transmission unit 30 to a desired one of the operation terminals 31 or the control terminals 32, the transmission signal Vs including the mode data MD as the control mode and an address of the desired operation or control terminal as the address data AD is sent out. When this transmission signal Vs is provided to the signal line Ls, the operation or control terminal in agreement with the address data AD receives the control data CD, and returns the supervisory data during the signal returning period WT. The transmission unit 30 checks as to whether the control data has been reliably transmitted to the desired operation or control terminal according to the relationship between the sent control data CD and the supervisory data received during the signal returning period WT. The control terminal 32 outputs a load-control signal for controlling the lighting device L as the load according to the received control data CD. On the other hand, the operation terminal 31 outputs a supervisory signal for indicating the operation of the lighting device L on the check lamp according to the received control data CD.

Under normal conditions, the transmission unit 30 sends out the transmission signal Vs including the mode data MD as a dummy mode at a regular time interval (Normal Polling). When a supervisory input is generated by operation of the input switch Sa, Sb, the operation terminal 31 transmits information about the occurrence of the supervisory input to the transmission unit 30. That is, the operation terminal 31 generates an interrupt signal IT, as shown in FIG. 2C, in synchronization with the synchronization signal SY of the transmission signal Vs having the dummy mode. At the same time, an interrupt flag is set to make preparations for exchanging information with the transmission unit 30. When the transmission unit 30 receives the interrupt signal, the transmission signal having the mode data MD as an interrupt polling mode is sent out, while a high-order half of bits of the address data AD being increased in order. For example, when the address data AD is 8 bits, high-order 4 bits are increased in order. In the operation terminal 31 that generated the interrupt signal, when the high-order 4 bits of the address data AD of the transmission signal having the interrupt polling mode are in agreement with high-order 4 bits of the address set in the operation terminal 31, low-order 4 bits of the address are returned to the transmission unit 30 during the signal returning period WT. Thus, since the transmission unit 30 checks every 16 operation terminals 31 to find the specific operation terminal that generated the interrupt signal, it is possible to find the specific operation terminal 31 within a relatively short time period.

When the transmission unit 30 captures the address of the operation terminal 31 that generated the interrupt signal, the transmission signal having the mode data MD as a supervisory mode and the captured address data AD is sent out to the signal line Ls. Against this transmission signal, the operation terminal 31 returns information to be transmitted during the signal returning period WT. Finally, the transmission unit 30 sends out an interrupt reset signal to the operation terminal 31 that generated the interrupt signal to cancel the interrupt flag of the operation terminal 31. According to the above-described manner, the transmission of information from the operation terminal 31 to the transmission unit 30 is completed by four signal transmissions (dummy mode, interrupt polling mode, supervisory mode, and interrupt reset) from the transmission unit 30 to the operation terminal 31. To check the operating condition of a desired control terminal 32, the transmission unit 30 sends out the transmission signal having the mode data MD as the supervisory data.

In summary, when the supervisory input is generated by operation of the switch Sa, Sb of the operation terminal 31, the supervisory data corresponding to the supervisory input is returned from the operation terminal 31 to the transmission unit 30. When the transmission unit 30 transmits the control data CD to the control terminal 32, the control terminal 32 outputs the load-control signal to control the lighting device L as the load. At this time, a load supervisory input is provided to the control terminal 32. The supervisory data corresponding to the load supervisory input is returned to the transmission unit 30, and the returned supervisory data is transmitted to the operation terminal 31. According to this transmission signal, the operation terminal 31 outputs the supervisory signal. The supervisory output is generally used to turn on and off the check lamp.

The separate switch 31a comprises the switch Sa having four circuits at the maximum. The control terminal 32 is capable of controlling the lighting device L having four circuits at the maximum. To separately identify the switch Sa and the lighting device L, a load number of 2 bits is added to the separate switch 31a and the control terminal 32. The address of the separate switch 31a or the control terminal 32 is hereafter referred to as channel. The channel and the load number are designated as address. That is, each of the switches Sa, Sb and the lighting device L has an individual address. In addition, for the sake of clarity, one of the control terminals 32 and one of the separate switches 31a in a one-to-one address correspondence with the control terminal 32 are set to the same channel. In the fact, the operation terminal can be distinguished from the terminal operation. For example, high-order few bits of the address data are used to identify the difference therebetween. Low-order few bits of the address data are used as the channel.

By the way, in the supervisory remote control system, the transmission unit 30 manages an address correspondence between the switch Sb and the lighting device L. Therefore, when a set of relation data including a statement of an address correspondence between a single switch Sb having one circuit and a plurality of lighting devices L and control data including control parameters of the lighting devices L are programmed in the transmission unit 30, the lighting devices L can be controlled in a batch manner by operation of the single switch Sb. The batch control comprises a group control and a pattern control of the lighting devices L.

In the group control, all of the loads in a predetermined area are controlled under the same condition. For example, as shown in FIG. 3A, a first group of 8 lighting devices L can be turned on in the batch manner. In addition, as shown in FIG. 3B, the 8 lighting devices of the first group and 4 lighting devices of a second group can be turned on in the batch manner. On the other hand, in the pattern control, all of the loads are controlled according to a predetermined operation pattern. For example, as shown in FIG. 4A, the lighting devices L can be turned on according to a first illumination pattern, which is suitable for power conservation during a lunch hour. In addition, as shown in FIG. 4B, the lighting devices L can be turned on according to a second illumination pattern such that only 4 lighting devices disposed adjacent to windows are turned off. This second illumination pattern is suitable for power conservation when sunlight is supplied through the windows. The pattern control or the group control can be achieved by suitably programming the address correspondence. In FIG. 1, the switch Sb is for the pattern control, and a switch for the group control is not shown.

The supervisory remote control system has two operation modes of a control mode for controlling the loads such as the lighting devices L, and a programming mode for programming the group control or the pattern control of the lighting devices. When the remote control system is operated, the transmission unit 30 first becomes the control mode, so that the transmission signal having the dummy mode is provided to the signal line Ls. When there is no interrupt signal, the normal polling for repeatedly generating the transmission signal having the dummy mode is performed. When there is the interrupt signal, the operation terminal 31 is determined, so that a request from the operation terminal 31 is captured. At this time, when there is no request for changing the operation mode, the present operation mode is identified. When the operation mode is the control mode, the lighting devices L are controlled. When the operation mode is the programming mode, conditions for the group control or the pattern control are set. On the other hand, when there is the request for changing the operation mode, the operation mode is changed according to the request.

To set the conditions for the pattern control in the programming mode, the switch Sb of a desired pattern switch 31b is operated, and then the switch Sa in the address correspondence with the lighting device L to be controlled by the switch Sb is operated. In this case, the relationship between the switch Sa and the lighting device L is previously determined. As a result, the operating condition of the lighting device L corresponding to the operation of the switch Sa is stored as a set of the relation data and the control data in the transmission unit 30, to thereby make the correspondence between the single switch Sb and the plural lighting devices L. The conditions for the group control can be set according to a similar manner to the above.

[Portable Programming Device]

Figure 10:
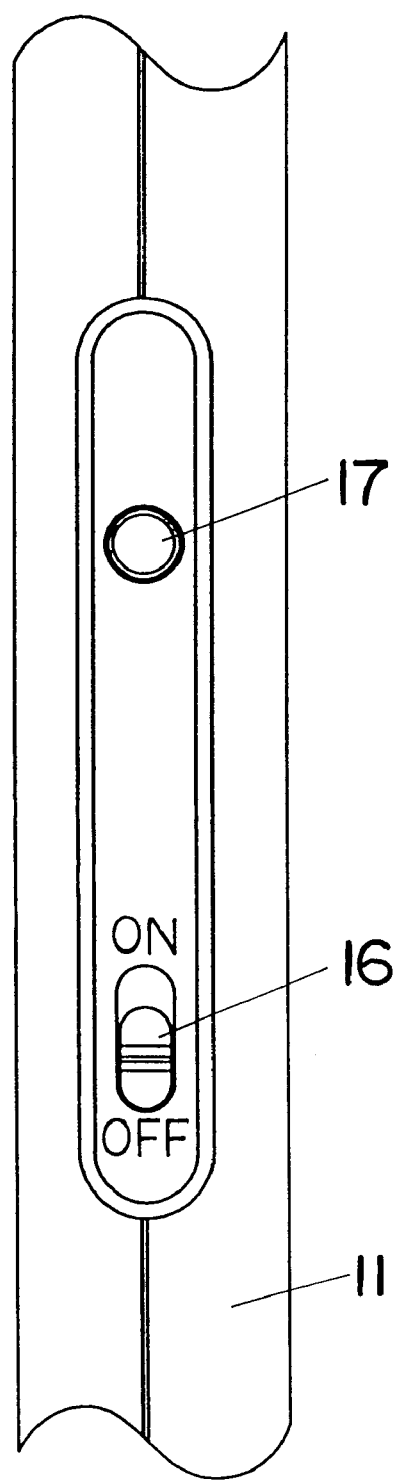
FIG. 10 is a partially-magnified view of a power switch of the programming device.

The portable programming device of the present invention is preferably used in the supervisory remote control system described above. That is, as shown in FIGS. 5 to 10, the programming device 34 has a hand-held type flat housing 11, which is formed with a rear body 11a and a front cover 11b. The flat housing 11 has a display unit 12 with a liquid crystal monitor 22 provided at an upper portion on the front surface thereof, and an operation unit 13 composed of a plurality of buttons and provided at a lower portion of the front surface. As the liquid crystal monitor 22, it is preferred to use a dot-matrix type monitor that can display letters and figures. The liquid crystal monitor 22 is exposed through an aperture 11c formed in the front cover 11b. The numeral 12a designates a transparent cover for protecting the liquid crystal monitor 22. The numeral 14 designates an infrared-translucent window, through which an infrared signal explained later is emitted or received. The numeral 15 designates a receptacle used to connect with the signal line Ls. In addition, as shown in FIG. 10, the numerals 16 and 17 designate a slidable lever of a power switch SW1 of the programming device, and a button of a backlight switch SW2 for turning on/off the backlight for the liquid crystal monitor 22, respectively.

Figure 11:
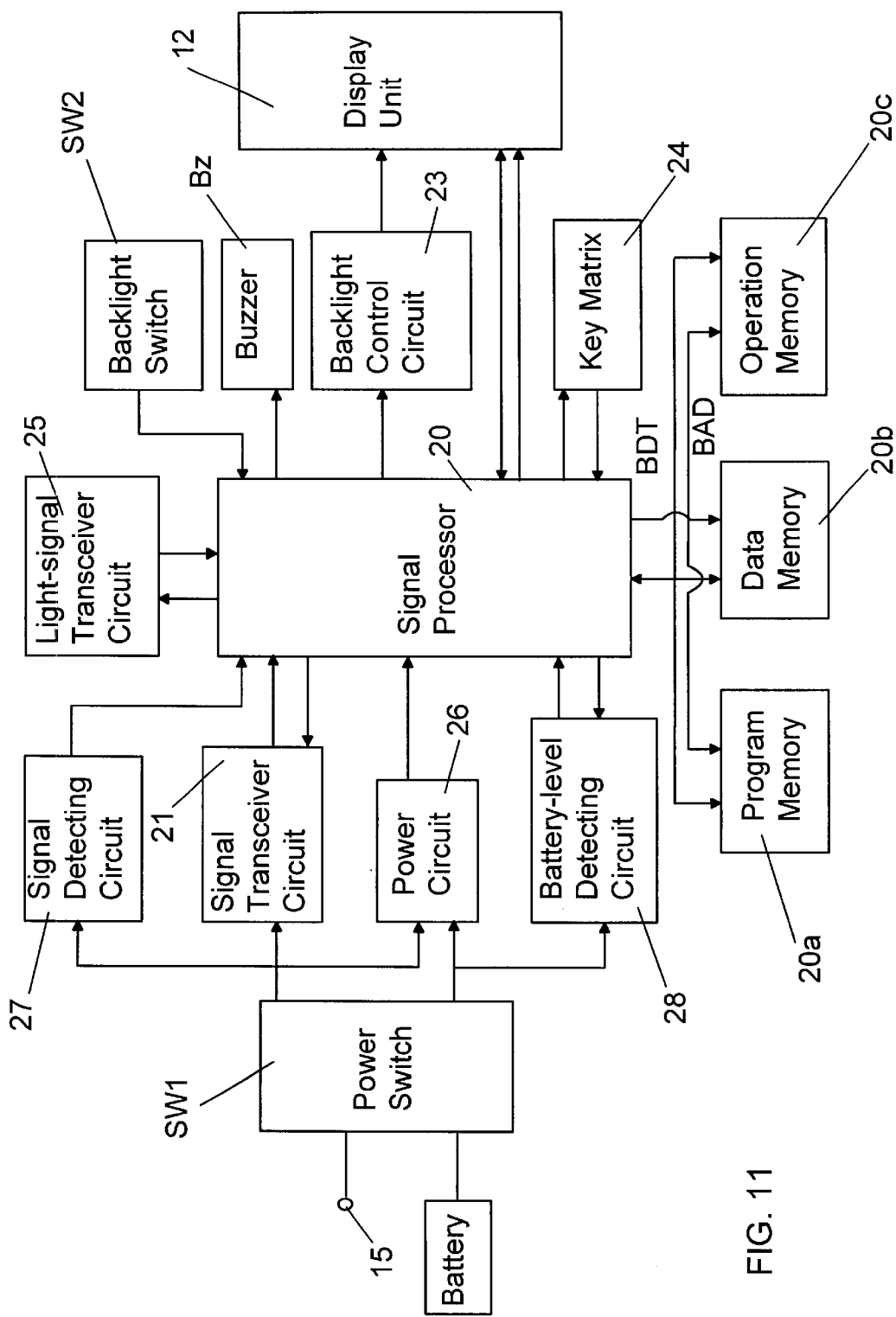
FIG. 11 is a schematic circuit diagram of the programming device of the present invention.

As shown in FIG. 11, the flat housing 11 of the programming device 34 accommodates a signal processor 20 having a microcomputer as the main component. The signal processor 20 is connected to a program memory 20a that is a flush memory for storing a system program, data memory 20b that is a flush memory for storing the relation data and the control data prepared when programming conditions for the group control or the pattern control, and an operation memory 20c that is a static random access memory (SRAM) for provisionally storing data to be memorized, through a data bus BDT and an address bus BAD. Since the flush memory is used, the data stored in the program memory 20a and the relation data and the control data stored in the data memory 20b can be safely maintained even when the supply of electricity to the programming device 34 is stopped.

Figure 12:
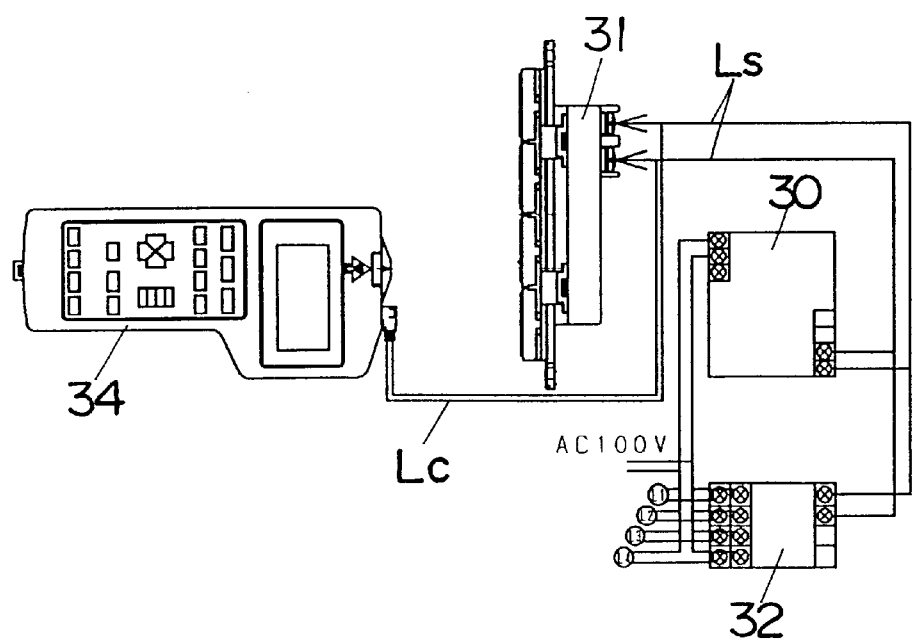
FIG. 12 is a schematic diagram of the portable programming device connected to the supervisory remote control system through a signal line.

The signal processor 20 is connected to the receptacle 15 through a transceiver circuit 21 and the power switch SWI. The transceiver circuit 21 is a circuit for providing a data transmission between the programming device 34 and the transmission unit 30 through the signal line Ls. In this embodiment, a jack-type receptacle is used as the receptacle 15. Therefore, as shown in FIG. 12, a connection line Lc having a connector that is detachably connected to the receptacle 15 is used to obtain the connection between the programming device 34 and the signal line Ls. As the connector, it is preferred to use an alligator clip, pin plug or a Y-type terminal.

Figure 8:
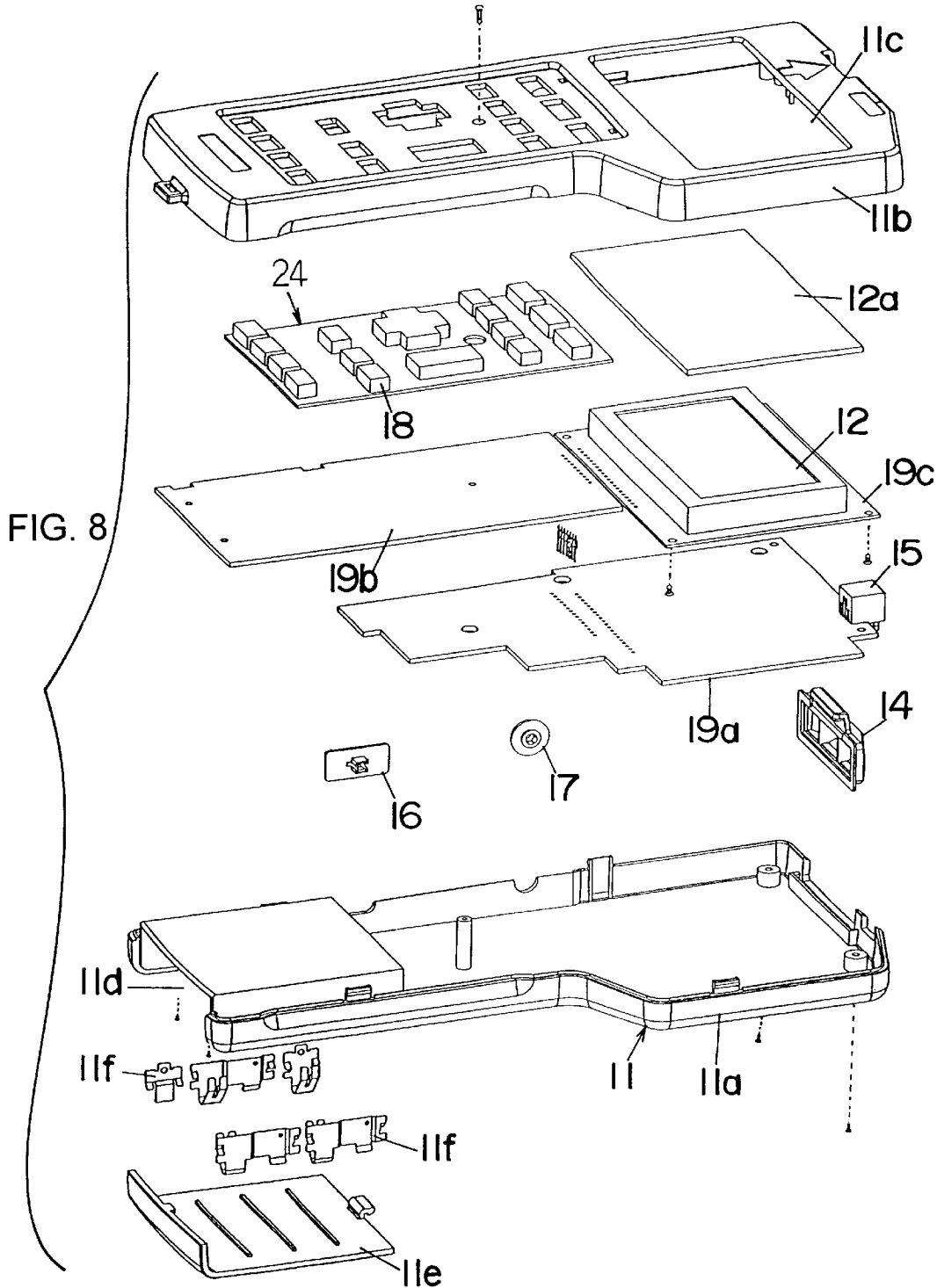
FIG. 8 is an exploded perspective view of the portable programming device.
Figure 9:
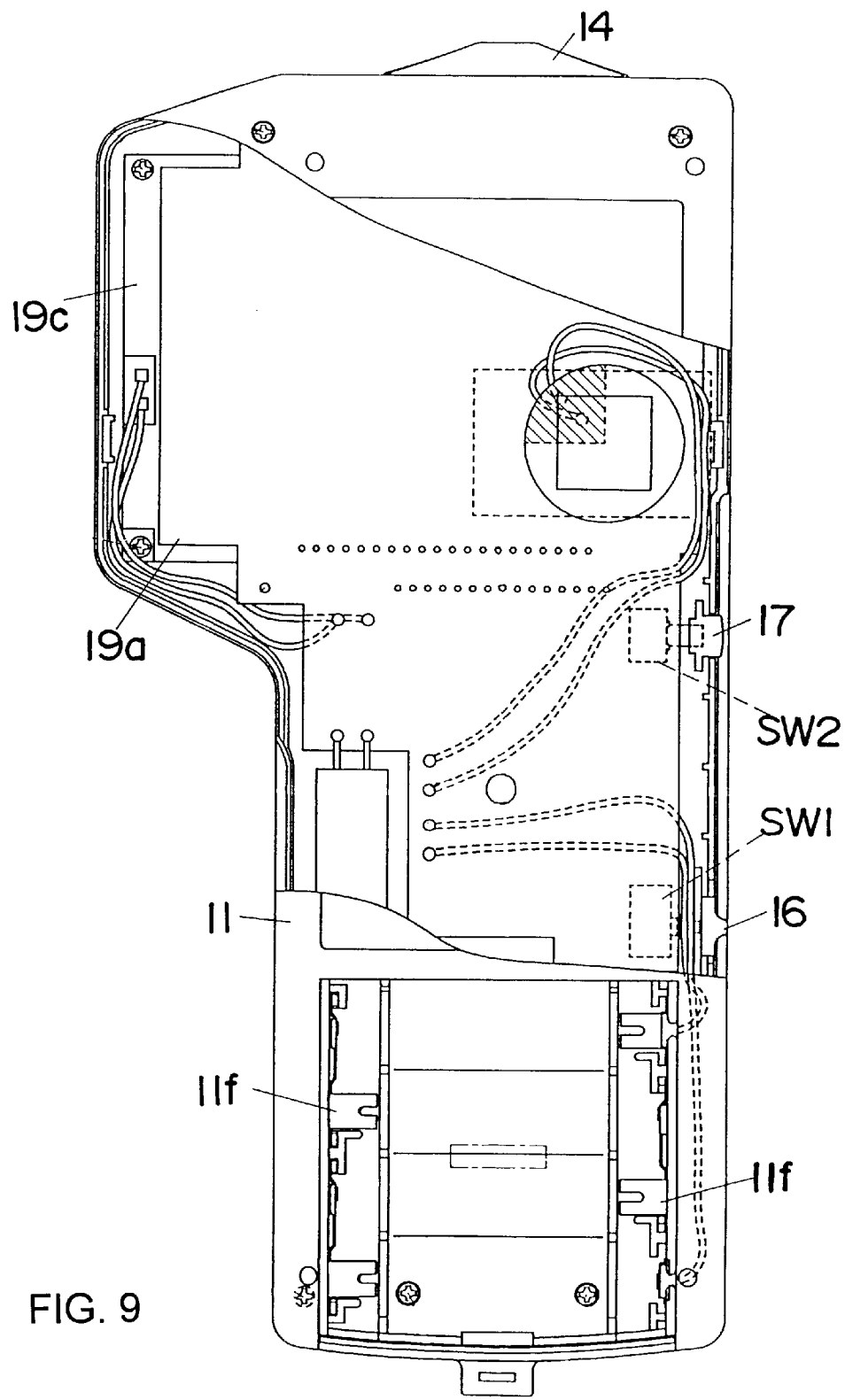
FIG. 9 is a partially-transparent, rear view of the portable programming device.

The signal processor 20 is connected to the liquid crystal monitor 22 of the display unit 12. The liquid crystal monitor 22 has a backlight function, which is controlled in brightness by a backlight control circuit 23. As described above, the backlight function can be turned on/off by operation of the backlight switch SW2. In this embodiment, as shown in FIG. 8, a key matrix 24 with integrally-molded rubber buttons 18 is used as the buttons of the operation unit 13. When the rubber button 18 is released, the elasticity of the rubber button travels it to its original up position.

The signal processor 20 is connected to a light-signal (wireless signal) transceiver circuit 25 for transmitting and receiving the infrared signal. The light-signal transceiver circuit 25 uses a light-emitting diode or a photo diode to provide the infrared signal. In addition, the signal processor 20 has a beeping unit for providing an operation beep every operation of the operation unit 13 and sounding an alarm indicating an operation error from a buzzer Bz.

When the programming device 34 is connected to the signal line Ls through the receptacle 15, an inner power source can be obtained by rectifying and stabilizing the transmission signal passing the signal line Ls. In addition, when the programming device 34 is not connected to the signal line Ls, a battery built in the flat housing 11 can be used. A power circuit 26 selects one of the power provided from the signal line Ls and the power provided from the battery, and supplies electricity to the signal processor 20. To make a decision as to whether the programming device 34 is connected to the signal line Ls, whether the transmission signal is input in a signal detecting circuit 27 is checked.

As shown in FIG. 8, the above-described circuits are accommodated in the flat housing 11 by use of three printed circuit boards 19a to 19c. The operation unit 13 is composed of a switch circuit pattern on the printed circuit board 19b and the key matrix 24 with the rubber buttons 18. The key matrix 24 is held between the printed circuit board 19b and the cover 11b such that the rubber buttons 18 are exposed through button holes formed in the cover 11b. In addition, a space 11d for the battery is provided at a lower portion in the body 11a. The numeral 11e designates a detachable battery cover 11e for covering the space 11d. In this embodiment, four AA batteries (nominal output power: 6V) are accommodated in space 11d. The numeral 11f designates a battery terminal disposed in the space 11d of the flat housing 11.

With respect to the operation terminal 31 and control terminal 32 used in this embodiment, a terminal processor having a microcomputer as the main component is used to swap data with the transmission unit 30. The terminal processor comprises a data memory unit having an EEPROM, which is used to store the address and the type of the terminal, and a wireless signal transceiver, which is used to transmit and receive the light signal. The light signal is used to set, correct and check the information stored in the data memory unit.

As described above, there are various types of the operation terminals 31. For example, there are the separate switch 31a, pattern switch 31b, group switch (not shown) used to set the conditions for the group control, the light-adjusting switch 31c, and an input terminal that a sensor or a switch is connected as the supervisory input. On the other hand, as the control terminal 32, there are the relay terminal 32a, light-adjustment terminal 32c, and so on.

Each of these terminals has the terminal processor, data memory unit, and the wireless signal transceiver. The type of the operation terminal or the control terminal is stored in the data memory unit, and the terminal processor provides a required operation according to the type of the terminal. That is, since the data memory unit functions as a kind of memory switch or parameter memory, an operation of the terminal processor is determined according to settings of the data memory unit. In other words, the terminal processor has plural kinds of program modules. A determination as to which one of the program modules should be used is made according to the settings of the data memory unit. As the information that can be set in the data memory unit in addition to the type of the terminal, there are a temporary ON function of keeping the ON position of the load for a predetermined time period after an operation for turning on the load is performed, delay OFF function of turning off the load after the elapse of a predetermined time period from an operation of turning off the load, and a fade function of gradually increasing or decreasing the light output of the lighting device L after an operation of turning on or off the lighting device L is performed.

Figure 13:
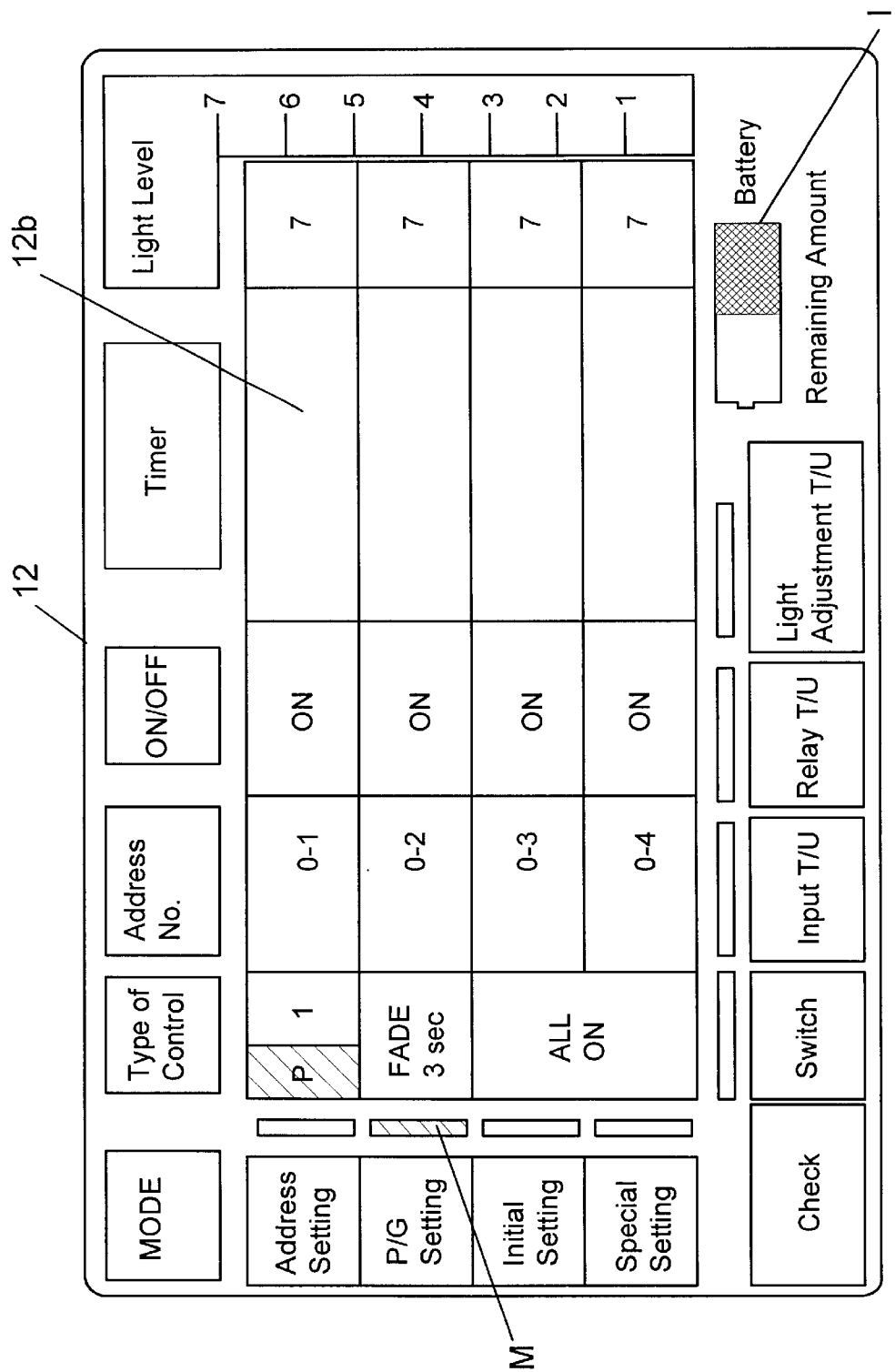
FIG. 13 is a magnified view of a display unit of the portable programming device.

As shown in FIG. 13, items of "Type of Control", "Address No.", "ON/OFF", "Timer" and "Light Level" are displayed along the top side on the liquid crystal monitor 12*b* of the display unit 12. Items of "MODE", "Address Setting", "P/G Setting", "Initial Setting", "Special Setting", and "Check" are displayed along the left side on the liquid crystal monitor 12*b*. In addition, items of "Switch", "Input T/U", "Relay T/U", "Light Adjustment T/U", and "Remaining Amount" are displayed along the bottom side on the liquid crystal monitor 12*b*. A marker M is disposed adjacent to each of the items of "Address Setting", "P/G Setting", "Initial Setting", "Special Setting", "Switch", "Input T/U", "Relay T/U", and "Light Adjustment T/U". The liquid crystal monitor 12*b* has a function of displaying the marker M in reverse video to indicate the item in active use.

A battery-shaped symbol I displayed on the liquid crystal monitor 12*b* is used to indicate a remaining amount of the battery. In this embodiment, the remaining amount of the battery is indicated by three levels. As a hatching area increases in the symbol I, the remaining amount of the battery is larger. In addition, as explained later, a set of the relation data and the control data can be transmitted between the transmission unit 30 and the programming device 34. However, under certain circumstances, it takes about 30 to 40 minutes to transmit the set of the relation data and the control data. In such a case, the remaining amount of the battery may become zero during the data transmission, so that the operation comes to nothing. Therefore, it is preferred to disable the data transmission when the remaining amount of the battery is smaller than a first threshold level. In addition, when the remaining amount of the battery reaches less than a second threshold value, which is smaller than the first threshold level, it is preferred to automatically turn off the power irrespective of operation.

For example, the programming device 34 according to this embodiment has a battery-level detecting circuit 28. In the detecting circuit 28, a voltage value of the battery is compared with predetermined first and second reference values. When the voltage value is larger than the first reference value, a half area of the symbol I is crosshatched, as shown in FIG. 13. When the voltage value is larger than the second reference value, all area of the symbol I is crosshatched. When the voltage value is smaller than the first reference value, only a corner area of the symbol I is crosshatched. The crosshatched area in the symbol I is controlled by the signal processor 20 according to the output of the battery-level detecting circuit 28.

In addition, when the remaining amount of the battery reaches almost one-half the original amount of the battery before use, it is preferred that an alarm message, for example, "Please exchange the battery.", is displayed on the liquid crystal monitor 12b. In addition, when the remaining amount of. the battery is reduced in such a degree that circuit operations can not be maintained, it is preferred that an alarm message, for example, "The battery becomes exhausted.", is displayed on the liquid crystal monitor 12*b*. Moreover, it is preferred that storing the data in the data memory 20*b* is performed after the elapse of about 20 seconds from the display of the alarm message.

As described above, the battery can be used as the power source. Therefore, when the user forgets about turning off the programming device 34, the battery becomes exhausted. In this embodiment, the signal processor 20 has a power-OFF unit for automatically stopping a supply of electricity from the battery when the operation unit 13 (key matrix 24) is not operated for a predetermined time period under the supply of electricity. That is, when the operation unit 13 is not operated for the predetermined time period, the power-OFF unit outputs an AUTO-OFF signal. According to the AUTO-OFF signal, the supply of electricity from the battery is automatically stopped by the power circuit 26.

Figure 14:
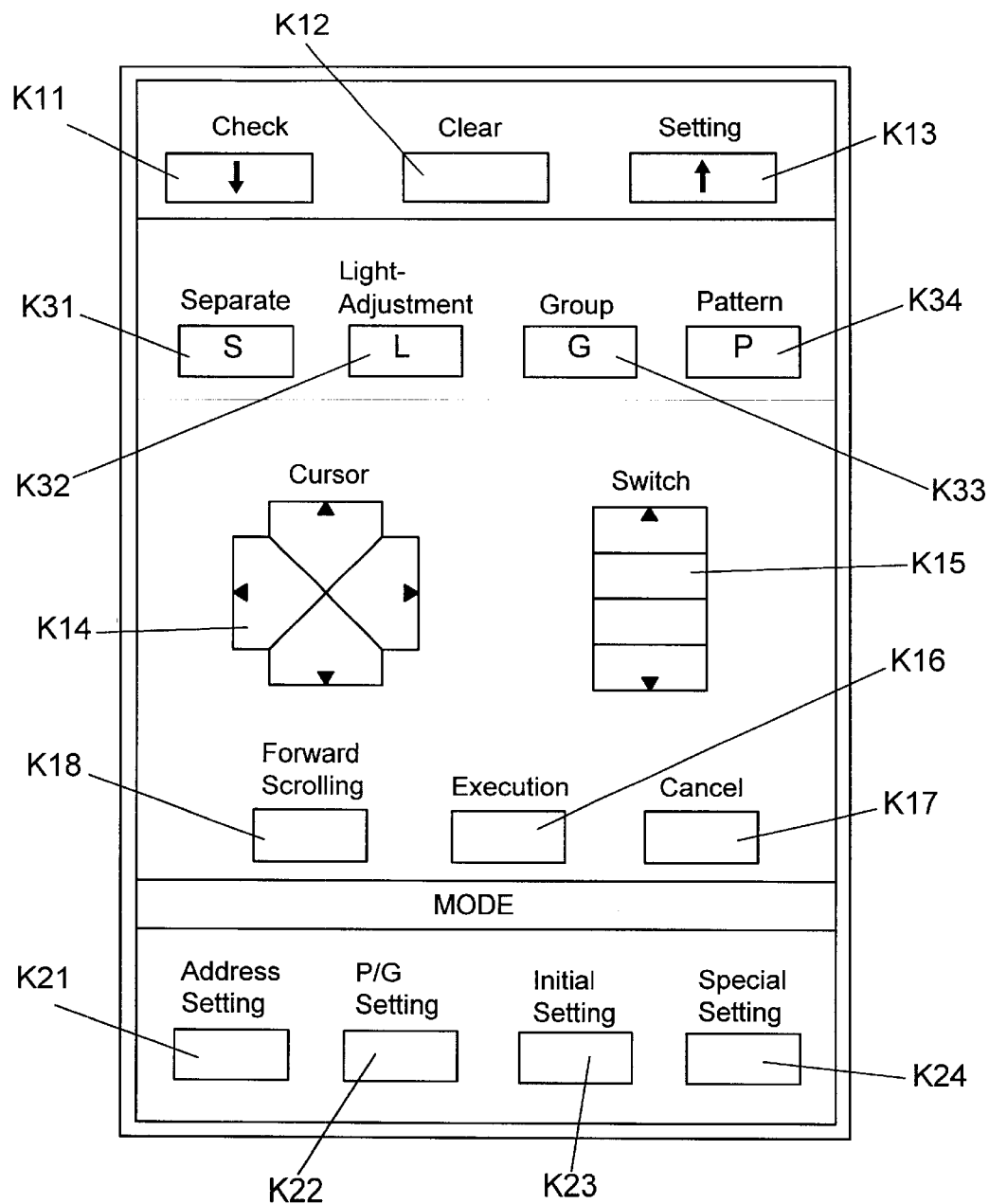
FIG. 14 is a magnified view of an operation unit of the portable programming device.

As shown in FIG. 14, the key matrix 24 of the operation unit 13 comprises a check key K11, clear key K12, setting key K13, cursor key K14, switch key K15, execution key K16, cancel key K17, forward scrolling key K18, address setting key K21, P/G setting key K22, initial setting key K23, special setting key K24, separate key K31, light-adjustment key K32, group key K33, and a pattern key K34.

The programming device 34 of this embodiment provides four operation modes of an address setting mode, pattern/group setting mode, initial setting mode and a special setting mode. One of these operation modes can be selected by pushing a desired one of the keys K21 to K24. The selected operation mode is displayed by the marker M on the liquid crystal monitor 12*b*, as shown in FIG. 13.

[Address Setting Mode]

When the address setting mode is selected by pushing the key K21, the marker M corresponding to the item "Address Setting" is displayed in reverse video. In this mode, it is possible to set or check the address and/or function data against the data memory unit of the operation or control terminal by use of the light signal. When the power is supplied without the connection between the programming device 34 and the signal line Ls, the address setting mode is automatically selected. That is, when there is no connection between the programming device 34 and the signal line Ls, the transmission signal is not detected by-the signal detecting circuit 27. Therefore, if the transmission signal is not detected when the power is turned on, the address setting mode is selected.

The liquid crystal monitor 12*b* provides a matrix of cells (4 rows×5 columns) in one screen, as shown in FIG. 13. As described above, one terminal has the four load numbers. Therefore, in the address setting mode, the matrix of cells can be used to program load conditions with respect to four addresses. Programming the load conditions can be performed in the cell displayed in reverse video. The cursor key K14 is a cross-hair key, which is used to change the position of the cell displayed in reverse video. By pushing a portion of the cursor K14 corresponding to a desired direction, the position of the cell displayed in reverse video can be changed.

The contents of a cell in the column corresponding to the item "Type of Control" can be changed by displaying the cell in reverse video, and then operating the switch key K15 or the keys K31 to K34. In case of using the switch key K15, a desired one of "Separate", "Light-Adjustment", "Pattern" and "Group" can be selected by operation of the key K15. On the other hand, in case of using the keys K31 to K34, one of "Separate", "Light-Adjustment", "Pattern" and "Group" can be determined by simply pushing a desired one of the keys K31 to K34.

When selecting "Separate", as shown in FIG. 15, the channel number and the load number combined by hyphenation are displayed in a cell of the column corresponding to the item "Address No.", as shown in FIG. 16. Each of the channel number and the load number is independently displayed in reverse video. In FIG. 16, the channel number "0" is displayed in reverse video, i.e., in a hatching region. The position of the hatching region in the cell can be changed by operation of the cursor key K14. When the channel number is displayed in reverse video, it is possible to increase or decrease the channel number by operation of the key K15. Similarly, when the load number is displayed in reverse video, it is possible to increase or decrease the load number by operation of the key K15.

When selecting "Pattern" (P) or "Group" (G), a pattern number or a group number is provided as a numeric value in a cell of the column corresponding to the item "Address No.". The pattern number is defined as a name given to a set of the relation data and the control data for the pattern control. Similarly, the group number is defined as a name given to a set of the relation data and the control data for the group control. The pattern number or group number in the cell displayed in reverse video can be changed by operation of the switch key K15.

When selecting "Separate" or "Group", it is possible to change the contents of a cell of the column corresponding to the item "Timer". That is, when the cell is displayed in reverse video, the temporary ON function or the delay OFF function can be selected by operation of the switch key K15. When selecting the temporary ON function, the ON position of the load is kept for a predetermined time period after the operation of turning on the load is performed. In this embodiment, as the time period, it is possible to select 30 seconds, 1 minute, 5 minutes, 60 minutes or 120 minutes. On the other hand, when selecting the delay OFF function, the load is turned off after the elapse of a predetermined time period from the operation of turning off the load. In this case, as the time period, it is possible to select 30 seconds, 1 minute or 5 minutes. In the fact, a desired combination of the timer function and the time period can be selected from combinations of "Timer Off", "Temporary ON and 30 seconds", "Temporary ON and 1 minute," . . . "Delay OFF and 30 seconds", "Delay OFF and 1 minute", and "Delay OFF and 5 minutes" by operation of the switch key K15. The "Timer OFF" means that neither of the temporary ON function and the delay OFF function is used.

After programming the conditions on the first (top) row of the matrix with respect to the items of "Type of Control", "Address NO." and "Timer" is finished according to the above-described procedure, the similar programming operation is performed on the second, third and fourth rows, if necessary. After the infrared translucent window 14 of the programming device 34 is brought close to the wireless transceiver of a desired operation or control terminal, the setting key K13 is pushed, so that the light signal is sent to the wireless transceiver to store the set conditions on the display unit 12 in the data memory unit of the required terminal. At this time, the beeping unit of the data processor 20 generates the operation beep informing that the set conditions are normally stored in the data memory unit.

Programming the conditions to another terminal can be performed by repeating the above procedure. Alternatively, by pushing the forward scrolling key K18, only the address (the channel number) is scrolled forward (the next higher channel). Therefore it is possible to set the conditions to the another terminal while displaying the previously set conditions on the display unit 12. Thus, the functions of the separate switch 31a and the group switch (not shown) can be set according to the above-described procedure.

On the other hand, when setting the conditions (data) in the data memory unit of the pattern switch 31b, "Pattern" is selected. In this case, it is possible to set only the item "Address NO.". That is, only an identifier of the relation data used for the pattern control is provided. The contents displayed on the display unit 12 can be registered in the data memory unit of the required terminal by operation of the setting key K13.

When setting the conditions in the data memory unit of the light-adjustment switch 31c of the operation terminal 31, "Separate" is selected to set the item "Address NO.". In the light-adjustment switch 31c, it is possible to set the item "Timer". However, the setting of "Timer" is ignored. A horizontal line "—" is displayed in the cell that changing the setting is not permitted.

The above procedure can be performed to set the address and functions of the control terminal 32 as well as the operation terminal 31. To check the data stored in the data memory unit of the operation or control terminal, a list of the data stored in the data memory unit can be displayed on the liquid-crystal monitor 12b by pushing the check key K11 under the condition that the transmission of the light signal is feasible

[Pattern/Group Setting Mode]

When selecting the pattern/group setting mode by pushing the P/G setting key K22, the marker M corresponding to the item "P/G Setting" is displayed in reverse video. In this case, it is possible to program and check the relation data and/or the control data for the pattern control or the group control. In this mode, it is necessary to connect the programming device 34 to the signal line Ls through the connection line Lc, as shown in FIG. 12. When the power is supplied to the programming device 34 under the connection between the programming device 34 and the signal line Ls, the pattern/group setting mode is provided. Before shifting to the pattern/group setting mode, it is necessary to previously set the address of each of the operation and control terminals in the address setting mode.

In the pattern/group setting mode, as shown in FIG. 17, the pattern number or group number, information as to whether the fade function for the lighting devices L is needed, and information about a batch ON/OFF process explained later, are provided on the column corresponding to the item "Type of Control". The contents of the other columns are the same as the case of the address setting mode. In this case, it is possible to use the third and fifth columns that are not used in the address setting mode. That is, information of the ON/OFF operation of the load is provided on the third column, and the light-adjustment level of the lighting device L is provided on the fifth column by a numeric value of 1 to 7.

When selecting the pattern/group setting mode, the type of "P" (pattern) or "G" (Group) and the pattern number or group number are displayed in the top cell of the column corresponding to the item "Type of Control". In FIG. 17, the type of "P" and the pattern number "1" combined by hyphenation are displayed in the top cell. Each of the type and the pattern number or group number can be independently displayed in reverse video to set or change their settings. That is, when pushing the group key K33, the type of "P" is selected. When pushing the pattern key K34, the type of "G" is selected. Alternatively, the type of "P" or "G" can be selected by operation of the switch key K15. Only the pattern number or group number in the top cell can be displayed in reverse video by operation of the cursor key K14. Then, the pattern number or group number can be changed by operation of the switch key K15.

When plural sets of the relation data and the control data for the pattern control or the group control are previously programmed in the transmission unit 30, a list of sets of the relation data and the control data of a desired pattern number or group number can be displayed on the display unit 12, as shown in FIG. 18. That is, after the pattern control or the group control is selected, and the desired pattern number or group number is designated, the check key K11 is pushed to obtain the list on the display unit 12. In this embodiment, only four addresses can be displayed on the display unit 12 at a time. Therefore, when the sets of the relation data and the control data of more than four addresses are included in the list, it is possible to display the set of the relation data and the control data corresponding to a desired address on the display unit 12 by operating the switch key K15 under the condition that the column of the item "Address NO." is displayed in reverse video.

In addition, the sets of the relation data and the control data for the pattern control or the group control can be edited according to the following procedure. As described before, the group control is for the purpose of controlling the loads in a batch manner such that all of the loads in a predetermined region are operated under the same condition. On the other hand, the pattern control is for the purpose of controlling the loads in a batch manner such that the loads are operated according to a predetermined pattern. Thus, the group control is regarded as a special case of the pattern control. Therefore, the editing operation of the sets of the relation data and the control data for the pattern control is explained first. When editing the sets of the relation data and the control data for the pattern control, the type of "P" and the pattern number are designated. In the column of the fade function, it is possible to select any one of "FADE None", "FADE 3 second", "FADE 6 second", and "FADE 1 minute" by operation of the switch key K15. That is, when the fade function of the lighting device L is needed, the fade function is performed at a time period selected from 3 seconds, 6 seconds, and 1 minute.

With respect to the information about the batch ON/OFF process meaning that all of desired loads are turned on or off in a batch manner, it is possible to select any one of functions "All ON", "All OFF", "All Level", "Batch Edit" and "All Clear". When preparing a set of the relation data and the control data for controlling a large number of loads under the same condition by the pattern control, these functions are useful to reduce time for the preparation of the relation data and the control data because the same control conditions are selected in a batch manner and then only a required parameter of the control conditions can be changed.

In the function of "All ON", all of the loads in the predetermined region are controlled in the ON position. In the function of "All OFF", all of the loads in the predetermined region are controlled in the OFF position. In the function of the "All Level", all of the lighting devices L in the predetermined region that are adjustable in illumination conditions are controlled in the same light-adjustment level. The light-adjustment level can be changed by operation of the switch key K15. The function of "Batch Edit" is used to set an address range, in which the function of "All ON", "All OFF", "All Level" or "All Clear" becomes effective. The address range can be set by operation of the cursor key K14 or the switch key K15. In the function of "All Clear", all of the loads in the predetermined region are removed from a focus of the pattern control. Therefore, when the address range is set by the function of "Batch Edit", each of the functions "All ON", "All OFF", "All Level" and "All Clear" becomes effective in the address range. When the address range is not set, these functions are effective in all of the addresses (loads). In this case, a desired one of these functions is selected by operation of the switch key K15, and then the execution key K16 is pushed. The selected function can be canceled by operation of the cancel key K17.

A data editing operation can be performed by use of the function of "All ON", as explained below. When using the function of "All ON", all of the cells of the column corresponding to the item "ON/OFF" are set in the ON position. After the column of the item "Address NO." is displayed in reverse video, as shown in FIG. 19, a desired address is selected from the addresses displayed on the display unit 12 by pushing the switch key K15 for a short time period. When the desired address is not found, another addresses can be displayed on the display unit 2 to find the desired address by pushing the switch key K15 for a relatively long time period, e.g., 2 seconds. Thus, the desired address can be displayed on the display unit 12. Next, as shown in FIG. 20, the cell corresponding to the desired address of the column of the item "ON/OFF" is displayed in reverse video by operation of the cursor key K13. The contents of the cell can be changed by operation of the switch key K15. That is, it is possible to select "ON", "OFF", or "Out of Area". When selecting "Out of Area", the designated address is removed from a focus of the pattern control.

When the column of the item "Timer" is displayed in reverse video, conditions of the timer can be set according to the same manner as the address-setting mode. That is, a desired combination of the timer function and the time period to be controlled is selected from the combinations of "Timer Off", "Temporary ON and 30 second", "Temporary ON and 1 minute", . . . "Delay OFF and 1 minute", and "Delay OFF and 5 minute" by operation of the switch key K15.

In the pattern control, as described above, a desired light-adjustment level can be selected by operation of the switch key K15 under the condition that the column of the item "Light Level" is displayed in reverse video. The selection of the light-adjustment level is feasible to only the address having the ON position in the column of the item "ON/OFF". After the items of "ON/OFF", "Timer", and "Light Level" are programmed with respect to each of the addresses belonging to a desired pattern number, if necessary, the setting key K13 is pushed to store them as the relation data and the control data in the data memory 20b.

The relation data and the control data for the group control can be set according to substantially the same procedure as the case of the pattern control except for the following points. In this case, only three kinds of functions "All Group", "Batch Edit" and "All Remove" are available. In the "All Group" function, when an address range is not previously designated by the "Batch Edit" function, all of the loads in the system are regarded as a group. When the address range is designated, all of the loads in the designated address range are regarded as the group. In the "All Remove" function, when the address range is previously designated in the "Batch Edit" function, all of the loads in the designated address range are removed from the group. When the address range is not designated, all of the loads in the system are removed from the group.

In addition, after the addresses to be included in the group are determined, it is possible to switch between setting a load in the ON position and removing the load from the group by operation of the switch key K15 under the condition that the column of the item "ON/OFF" is displayed in reverse video. After a desired one of these functions is selected by operation of the switch key K15, the selection is set by pushing the execution key K16, or cancelled by pushing the cancel key K17.

[Initial Setting Mode]

When the key K23 is pushed, the initial setting mode for setting various functions of the programming device 34 is provided. The marker M disposed adjacent to the item "Initial Setting" is displayed in reverse video. In this mode, as shown in FIG. 21, it is possible to set each of the following items "Operation Beep", "Power OFF Time", "Transmission unit" and "Checking the number of terminals". The item to be set can be selected by operation of the cursor key K14. The data of the selected item can be changed by operation of the switch key K15. The data of the selected item is displayed in reverse video.

In the item "Operation Beep", whether the function of sounding the operation beep every operation of the operation unit 13 from the buzzer Bz is needed or not can be determined. In the item "Power OFF Time", whether an automatic power-OFF function of stopping a supply of electricity when the operation unit is not operated for a predetermined time period under the supply of electricity is needed or not is can be determined. In this embodiment, it is possible to select as the predetermined time period 5 minutes or 10 minutes. This function is useful to prevent the battery exhaustion due to carelessness. When this function is used, the contents of the operation memory 20c are stored in the data memory 20b of the flush memory.

In the item "Transmission Unit", the type of the transmission unit 30 used can be selected. That is, a model number of the transmission unit 30 can be selected by operation of the switch key K15. In addition, when electricity is supplied to the programming device 34 connected to the signal line Ls, it is possible to automatically check the type of the transmission unit. That is, various requests are sent from the programming device 34 to the transmission unit 30. The programming device 34 receives responses to the requests from the transmission unit. According to the responses, the type of the transmission unit 30 is checked. For example, when the transmission unit does not have a function of registering the relation data transmitted through the signal line Ls, it can not provide a response against a return request of the relation data sent from the programming device. In such a case, type of the transmission unit can be identified by the absence of the response from the transmission unit. Thus, the type of the transmission unit may be checked by use of the function of the transmission unit 30. After the type of the transmission unit is identified, available functions of the programming device 34 are selected according to the type of the transmission unit. In the item "Transmission Unit", when check is requested on the display unit 12, it is possible to push the execution key K16.

As described above, when the type of the transmission unit 30 is identified, the functions of setting the relation data and the control data of the programming device 34 are limited according to the type of the transmission unit. For example, when the transmission unit does not correspond to the function of controlling the light-adjustment level of the lighting device L, it is possible to limit the functions of the programming device 34 such that the function of setting the light-adjustment level can not be used when programming the control data. In addition, since the model number of the transmission unit 30 can be selected without the connection between the programming device 34 and the signal line Ls, it is possible to set the relation data and the control data according to the selected transmission unit only by use of the programming device.

In the item "Checking the number of terminals", whether a terminal check function of detecting a change of the number of terminals, i.e., the operation and control terminals, is needed or not can be determined. In this item, it is possible to select "Setting" or "Cancel". When the function "Setting" is selected, the change of the number of terminals connected to the signal line Ls is detected, and displayed on.the liquid-crystal monitor 12b of the display unit 12. That is, information including a notification that the number of terminals is changed and an address of an increased or decreased terminal is displayed on the display unit 12, as shown in FIG. 22. The screen of FIG. 22 can be cancelled by operation of the cancel key K17. This terminal check function is effective to detect a failure or a poor connection of the operation or control terminal. As a method of detecting the change of the number of terminals, it is preferred to keep track of the transmission signal provided from the transmission unit 30, and detect the occurrence of a change of the number of terminals when a response from an already-existing terminal is lost, or when a response from a terminal not yet in existence is received.

[Special Setting Mode]

When the key K24 is pushed, the special setting mode for setting various special functions of the programming device 34 is provided. The marker M disposed adjacent to the item "Special Setting " is displayed in reverse video. In the special setting mode, as shown in FIG. 23, it is possible to set each of the following items "Transmission Unit ", "Check", "Edit" and "Setting Condition". The item to be set can be selected by operation of the cursor key K14. The data of the selected item can be changed by operation of the switch key K15. The data of the selected item is displayed in reverse video.

In the item "Transmission Unit", three kinds of functions "Input", "Output", and "Comparison" are available. The "Input" function is for reading the relation data and the control data programmed in the transmission unit 30 into the programming device 34. The "Output" function is for writing the relation data and the control data from the programming device 34 into the transmission unit 30. The "Comparison" function is for comparing a set of the relation data and the control data programmed in the programming device 34 with the set programmed in the transmission unit 30.

Figures 24, 25, 26:
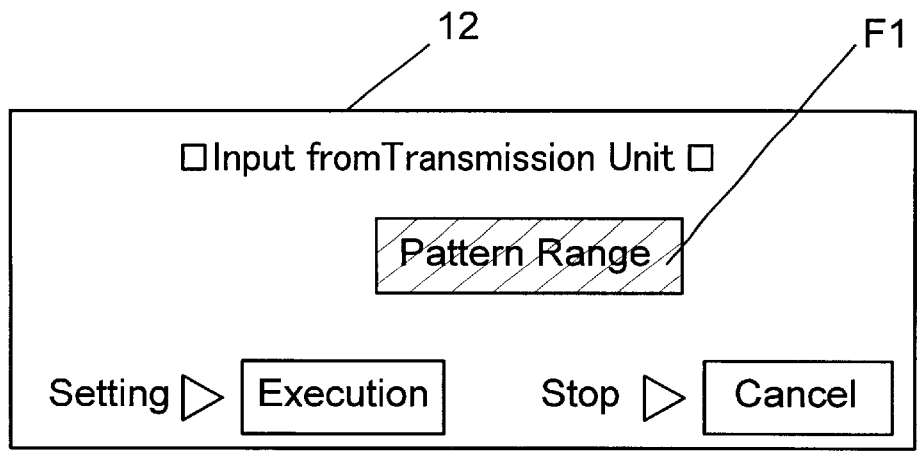

When selecting the "Input" function, a screen of FIG. 24 is displayed on the display unit 12. In the field F1, it is possible to select any one of "Pattern Range", "All Group", "Group Range", "All Data", and "All Pattern" by operation of the switch key K15. The selected function can be performed by operation of the execution key K16, or cancelled by operation of the cancel key K17. The "All Data" means all of settings including settings of the pattern control and settings of the group control. The "All Pattern" means all of the settings of the pattern control. The "All Group" means all of the settings of the group control. When selecting the "Pattern Range" or "Group Range", a screen for designating a range of the pattern number or group number is displayed on the display unit 12. By operating the switch key K15 and the cursor key K14 on this screen, it is possible to set the range of the pattern number or group number. Then, when the execution key K16 is pushed, the relation data and the control data of the designated range are transmitted from the transmission unit 30 to the programming device 34. When preparing the relation data and the control data according to the data read in the programming device 34 from the transmission unit 30, it is possible to go into the pattern/group setting mode described above by pushing the key K22.

When selecting the "Output" function, it is possible to transmit the relation data and the control data stored in the data memory 20b into the transmission unit through the signal line Ls. In the "Output" function as well as the "Input" function, a data transmission range can be designated. In addition, when the "Output" or "Input" function is selected, the pattern number or group number of the normally-transmitted set of the relation data and the control data is displayed in order on the display unit 12. When the data transmission is finished, a message, for example, "Data transmission is finished.", is provided on the display unit 12. Thus, since the operator of the programming device 34 can keep track of the proceeding of data transmission, it is possible to minimize anxiety of the operator.

When selecting the "Comparison" function, a set of the relation data and the control data programmed in the programming device 34 is compared with the set programmed in the transmission unit 30, as described above. The "Comparison" function is stopped immediately when a disagreement therebetween is detected, and the pattern number or group number corresponding to the disagreement is displayed on the display unit 12. Thus, since the agreement between settings of the transmission unit 30 and settings of the programming device 34 can be checked, it is possible to avoid needless data-writing operation into the transmission unit 30.

By the way, the data transmission between the programming device 34 and the transmission unit 30 is performed without interfering with the control of the loads during system startup. That is, when the data transmission is performed therebetween, the programming device 34 generates an interrupt signal as well as the operation terminal 31 to send a return request of the transmitted data to the transmission unit 30. Since the number of bits that can be transmitted by the transmission signal at a time is smaller than the number of bits of the relation data and the control data, those data is transmitted by plural transmission signals. Therefore, each of the transmission unit 30 and the programming device 34 has a counter to count the number of bits of the data transmitted therebetween. Whether the data transmission is finished is determined according to an output from the counter. In addition, when the operation terminal 31 generates the interrupt signal during the data transmission, the transmission unit 30 stops the data transmission, and services the interrupt signal provided from the operation terminal with priority. After the interrupt service is finished, the data transmission between the transmission unit 30 and the programming device 34 is resumed. Thus, it is possible to perform the data transmission without interfering with the control of the loads by operation of the switch SW. In general, since the frequency of occurrence of the interrupt signal from the operation terminal 31 is much smaller than the number of times the transmission signal having the dummy mode is transmitted, an idle time that is a time period for transmitting the transmission signal having the dummy mode is sufficient to transmit the relation data and the control data. In other words, even when the control of the loads is performed with priority, as described above, it is possible to transmit the relation data and the control data within a relatively short time period.

In the item "Check", it is possible to select a function of "Operation Check", "Unassigned Terminal Check", "Terminal Registration Check", or "System Condition Check".

When selecting the "Operation Check" function, fields F2 to F4 of "Type", "Number"and "Check", and a bar B for indicating the light-adjustment level, are provided on the display unit 12, as shown in FIG. 25. When the type and number is input by operation of the cursor key K14 and the switch key K15, the control conditions of the load and the light-adjustment level are displayed. In addition, it is possible to control the ON/OFF condition of the load by operating the switch key K15 under the condition that the field F4 is displayed in reverse video. Moreover, it is possible to control the light-adjustment level by operating the switch key K15 after the cursor is moved to the bar B.

Thus, the individual control of the load, pattern control, group control, and the control of the light-adjustment level are feasible by use of the programming device 34. By the way, in the "Operation Check" function, it is possible to check as to whether the transmission unit 30 normally operates by activating the programming device 34 as a simulation terminal having a supervisory input provided by operation of the operation unit 13 and an address, i.e., the input type and number, displayed on the display unit 12.

When selecting the "Unassigned Terminal Check" function, the list of unassigned address that is not under the control of the transmission unit 30 are displayed on the display unit 12, as shown in FIG. 26. When the number of unassigned addresses is greater than the number of addresses that can be displayed on the liquid crystal monitor 12b at a time, it is possible to scroll hidden portions of the list into view by operation of the switch key K15. A page number of the list is provided in the form of fraction at an upper right position of the screen. In FIG. 26, the page number is represented by "1/1". For example, when an additional operation or control terminal is used in the system, information about the addresses in use can be checked by use of this function. Therefore, it is possible to avoid address duplication, and prevent the occurrence of system error. In addition, it is possible to distinguish the operation and control terminals in use from unassigned terminals by receiving information about the operation condition of each of the operation and control terminals from the transmission unit 30.

When selecting the "Terminal Registration Check" function, a list of detail information about the pattern control or the group control of the individual terminal is displayed on the display unit 12. For example, as shown in FIG. 27, when an address number, e.g., 11-2, is designated on the display unit 12 by operation of the switch key K15 and the cursor key K14, and the execution key K16 is pushed, a list of the pattern number and the group number are provided. This function is useful to change the settings of the pattern control or the group control when performing a layout change. By obtaining the pattern number or the group number of a desired terminal, it is possible to readily understand the contents of the pattern control or the group control to be changed. In the past, the settings of the pattern control and the group control have been individually checked. By use of the above function, it is possible to remarkably improve the efficiency of programming operation. In the "Terminal Registration Check" function, information obtained by retrieving the relation data and the control data is displayed.

When selecting the "System Condition Check" function, a list including the control condition of the load and the address corresponding to the load is displayed, as shown in FIG. 28. This is achieved by detecting the transmission signal. In FIG. 28, the loads corresponding to the addresses 0 ch.-4, 1 ch.-2 and 2 ch.-2 are in the OFF position. By use of this function, information as to whether the loads are normally operating under the predetermined pattern control or group control can be readily checked. Therefore, this function is effective to check the presence or absence of programming errors.

In the item "Edit", it is possible to select a function of "Pattern Reverse", "Copy", "All Delete", or "Range". A desired one of these functions can be selected by operation of the switch key K15 and the execution key K16.

When selecting the "Pattern Reverse" function, it is possible to select the pattern number. That is, after the "Pattern Reverse" function is selected by operations of the switch key K15 and the execution key K16, the switch key K15 is operated to select the pattern number. After the pattern number is selected, and then the execution key K16 is pushed, a new set of the relation data and the control data, which is obtained by reversing the ON/OFF information of the control data corresponding to the pattern number, can be prepared. For example, with respect to an illumination area of the lighting devices L, it is possible to readily prepare a first set of the relation data and the control data for turning on the lighting devices L according to a pattern, and a second set of the relation data and the control data for turning off the lighting devices L according to the same pattern. That is, when a set of the relation data and the control data are previously copied by use of a "Copy" function explained later, and the "Pattern Reverse" function is used, the first and second sets of the relation data and the control data described above can be readily prepared. With respect to the terminal having the setting of "Out of Area", the ON/OFF information can not be reversed by use of the "Pattern Reverse" function.

When selecting the "Copy" function, a field for inputting "pattern" or "group", field for inputting an original region to be copied, and a field for inputting a target region that the copied original region should be provided, are displayed. The contents of each of those fields are designated by operation of the switch key K15. A copy of the control data of the original region can be supplied to the target region by operation of the execution key K16. By use of this function, when preparing two sets of the relation data and the control data having similar settings, it is not necessary to individually prepare those two sets. Therefore, this function remarkably improves the efficiency of data programming operation.

When selecting the "All Delete" function, it is possible. to select one of all data, all patterns, and all groups. By selecting a desired one of them, and pushing the execution key K16, it is possible to delete all of the relation data and the control data, all of the relation data and the control data under the pattern control, or all of the relation data and the control data under the group control, in a batch manner.

When selecting the "Range" function, it is possible to select a range of the pattern number or the group number. That is, "pattern" or "group" is first selected by operation of the switch key K15. Next, the pattern numbers or group numbers corresponding to the top and end of the range are designated by operation of the switch key K15. With respect to all addresses in the designated range, any one of modes "ON", "OFF" and "Out of Area" can be selected by operation of the switch key K15. Then, by pushing the execution key K16, it is possible to set plural sets of relation data and the control data for the pattern control or for the group control to any one of the modes "ON", "OFF" and "Out of Area" in a batch manner. Thus, this "Range" function is useful to reduce time for programming the data.

In the item "Setting Condition", it is possible to select a function of "P/G Setting", "List of P/G Setting", and "Unassigned P/G Display".

In the "P/G Setting" function, as the operation mode of the supervisory remote control system, it is possible to select one of a normal mode (i.e., control mode), where the loads are controlled by the transmission unit 30, and a programming mode, where controlling the loads is stopped and the relation data and/or the control data are set in the transmission unit 30. This selection can be achieved by operation of the switch key K15. As described above, when the relation data and the control data are set by use of the transmission signal, it is not necessary to switch the operation mode. That is, the transmission of the relation data and the control data is feasible under the normal mode.

In the "List of P/G Setting" function, a list of address information belonging to a desired pattern number or group number and the ON/OFF information of the load corresponding to the address information can be displayed. For example, as shown in FIG. 29, when the pattern number "P1" is designated, the ON/OFF information of the loads corresponding to the pattern number "P1" are displayed on the display unit 12. When the number of addresses belonging to the pattern number or group number is greater than the number of addresses that can be displayed on the display unit 12 at a time, it is possible to scroll hidden portions of the list into view by operation of the switch key K15.

Figure 30:
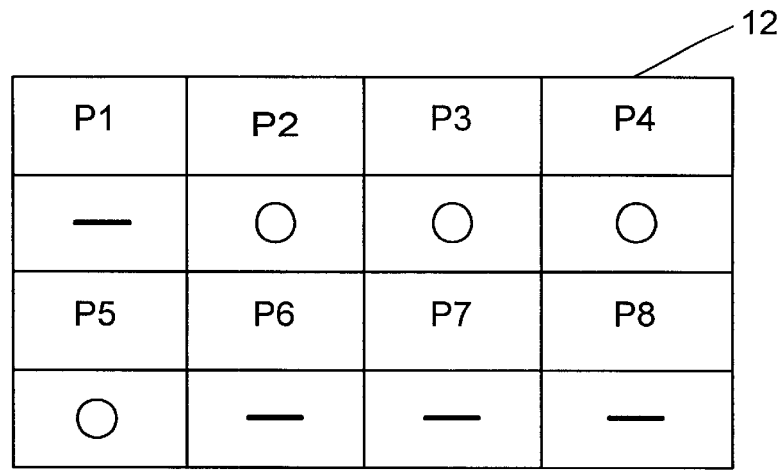
Figure 31:
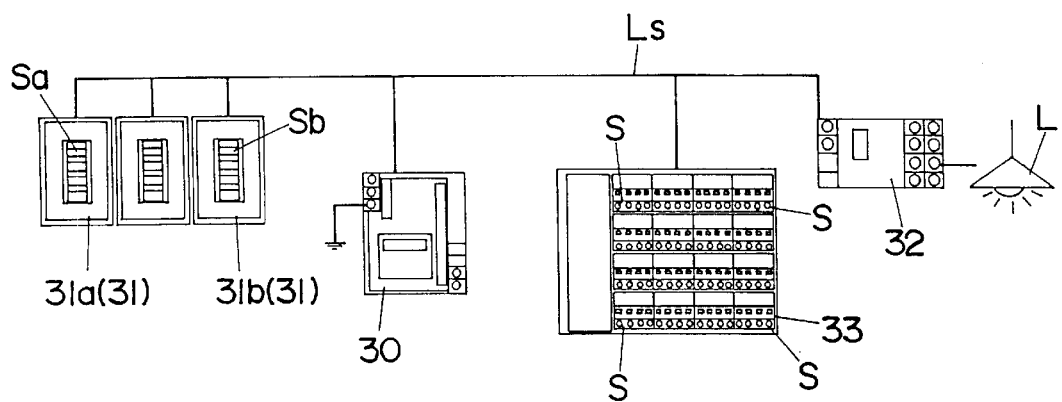
FIG. 31 is a schematic diagram of a conventional supervisory remote control system.

In the "Unassigned P/G Display" function, as shown in FIG. 30, a list of the pattern number or group number is displayed, and the symbol "○" is given to unassigned pattern number or group number. If necessary, it is possible to scroll hidden portions of the list into view by operation of the switch key K15. The pattern key K34 is pushed to display the pattern. numbers on the display unit 12. The group key K33 is pushed to display the group numbers on the display unit 12. By use of this function, the pattern numbers or group numbers in use can be immediately distinguished from the unassigned pattern numbers or group numbers. Therefore, when a terminal layout is changed or the operation or control terminal is added to the system, it is possible to avoid duplication of the pattern number or group number. This function is achieved by retrieving the relation data and the control data.

As described above, the programming device of the present invention is explained in detail according to the preferred embodiment. However, the present invention is not limited to this embodiment. It should be understood that the present invention includes various modifications that can be performed by ordinary skilled in the art within the scope of the present invention, which is defined by the appended claims. Since the programming device of the present invention has the convenience of portability as well as various convenient functions for efficiently and easily performing the data programming/checking operation, it is particularly suitable for the supervisory remote control system for controlling lighting devices and/or air conditioners in the office buildings and so on.

What is claimed is:

1. A portable programming device for a supervisory remote control system:

said remote control system comprising a signal transmission unit for supplying a transmission signal according to a time-division-multiplexing manner, a plurality of first terminals having individual addresses, a plurality of second terminals having individual addresses, and a signal line for connecting said transmission unit to each of the first and second terminals, said remote control system being adapted in use to control a load connected to one of the second terminals according to an input provided to one of the first terminals when a set of relation data including a statement of a one-to-one address correspondence between said one of the second terminals and said one of the first terminals and control data including control parameters of the load are set in said transmission unit, and to control loads connected to at least two of the second terminals according to an input provided to one of the first terminals in a batch manner when a set of relation data including a statement of an address correspondence between said at least two of the second terminals and said one of the first terminals and control data including control parameters of the loads are set in said transmission unit, and wherein said programming device has a hand-held type housing for accommodating:

a display for displaying data to be set;

an operation unit for programming an address of each of the first and second terminals, said relation data, and said control data with help of said display;

a data memory for storing the address, said relation data and said control data set by use of said operation unit, and said display; and a signal processor for carrying out a first signal process of transferring the address set by use of said operation unit and said display to a required one of said first and second terminals, and a second signal process of transferring said relation data and said control data stored in said data memory to said transmission unit; and wherein said signal processor further comprises a data retrieving unit for retrieving at least one set of said relation data and said control data corresponding to an address designated by said operation unit from said transmission unit, and listing a name given to said at least one set of said relation data and said control data on said display.

2. The portable programming device as set forth in claim 1, wherein said signal processor has a copy unit for copying a desired control parameter of said control data stored in said data memory to make another control data with use of the copied parameter.

3. The portable programming device as set forth in claim 1, wherein said control data includes information about an ON/OFF operation of the load, and said signal processor has a switch unit for switching between OFF and ON positions of the load with respect to said control data stored in said data memory.

4. The portable programming device as set forth in claim 1, wherein said signal processor has a first setting unit for setting the control parameters in a batch manner such that desired plural sets of said relation data and said control data are identical in all of the control parameters of the loads with each other, and a second setting unit for removing all of the loads concerning desired plural sets of said relation data and said control data from a focus of control in a batch manner.

5. The portable programming device as set forth in claim 1, wherein said programming device accommodates a battery in said housing, and said signal processor has a power-OFF unit for automatically stopping a supply of electricity from said battery when said operation unit is not operated for a predetermined time period under the supply of electricity.

6. The portable programming device as set forth in claim 1, wherein said programming device has a signal transceiver circuit for transmitting/receiving said transmission signal when said programming device is connected to said signal line, and said signal processor has a terminal check unit for checking said transmission signal through said signal transceiver circuit to detect a change of the number of the first and second terminals connected to said signal line according to address information included in said transmission signal.

7. The portable programming device as set forth in claim 1, wherein said signal processor has an unassigned-address check unit for receiving an operating condition of each of the first and second terminals from said transmission unit and providing a list of unassigned addresses that are available to additional terminals on said display.

8. The portable programming device as set forth in claim 1, wherein said signal processor has an unassigned-name check unit for retrieving at least one set of said relation data and said control data from said transmission unit, and providing a list of unassigned names that can be given to said at least one set of said relation data and said control data on said display.

9. The portable programming device as set forth in claim 1, wherein said signal processor has an operation check unit for receiving operating conditions of each of the first and second terminals from said transmission unit and providing a list of the operating conditions together with corresponding address information on said display.

10. The portable programming device as set forth in claim 1, wherein said signal processor has a set-name indicating unit for providing a name given to a set of said relation data and said control data on said display during a time period for transmitting the set of said relation data and said control data to said transmission unit.

11. The portable programming device as set forth in claim 1, wherein said programming device has a signal transceiver circuit for transmitting/receiving said transmission signal when said programming device is connected to said signal line, and said signal processor has a data transferring unit for transferring a set of said relation data and said control data to said transmission unit by use of said transmission signal during an idle time, in which said transmission signal is not used to control the load.

12. The portable programming device as set forth in claim 1, wherein said signal processor has a selection unit for switching between a control mode, where said transmission unit controls the load, and a programming mode, where controlling the load is stopped and a set of said relation data and said control data are set by use of said operation unit.

13. The portable programming device as set forth in claim 1, wherein said signal processor has a beeping unit for providing an operation beep every operation of said operation unit.

14. The portable programming device as set forth in claim 1, wherein said programming device has a signal transceiver circuit for transmitting/receiving said transmission signal when said programming device is connected to said signal line, and said signal processor has an operation test unit for checking as to whether said transmission unit normally operates by activating said programming device as a simulation terminal having a supervisory input provided by operation of said operation unit and an address provided on said display.

15. The portable programming device as set forth in claim 14, wherein the address provided on said display has a one-to-one address correspondence with one of the second terminals for controlling the load.

16. The portable programming device as set forth in claim 14, wherein the address provided on said display has an address correspondence with plural second terminals to control the loads in a batch manner according to a predetermined pattern.

17. The portable programming device as set forth in claim 14, wherein the address provided on said display has an address correspondence with plural second terminals to control all of the loads in a predetermined area under a same condition in a batch manner.

18. The portable programming device as set forth in claim 14, wherein the address provided on said display has an address correspondence with at least one of the second terminals for controlling a lighting device as the load, and said signal processor has a function of indicating a light-adjustment level of said lighting device.

* * * * *